(12) United States Patent
Nohmi et al.

(10) Patent No.: US 11,541,977 B2
(45) Date of Patent: Jan. 3, 2023

(54) COMMUNICATION SYSTEM FOR UNDERWATER DRONE AND AIRLOCK APPARATUS FOR DRONE

(71) Applicant: Ebara Corporation, Tokyo (JP)

(72) Inventors: Motohiko Nohmi, Tokyo (JP); Yumiko Sekino, Tokyo (JP)

(73) Assignee: Ebara Corporation, Tokyo (JP)

( * ) Notice: Subject to any disclaimer, the term of this patent is extended or adjusted under 35 U.S.C. 154(b) by 896 days.

(21) Appl. No.: 16/463,221

(22) PCT Filed: Nov. 20, 2017

(86) PCT No.: PCT/JP2017/041612
§ 371 (c)(1),
(2) Date: May 22, 2019

(87) PCT Pub. No.: WO2018/101099
PCT Pub. Date: Jun. 7, 2018

(65) Prior Publication Data
US 2020/0070941 A1    Mar. 5, 2020

(30) Foreign Application Priority Data

Nov. 30, 2016 (JP) .............................. JP2016-233063
Dec. 2, 2016 (JP) .............................. JP2016-235243

(51) Int. Cl.
*B63G 8/00* (2006.01)
*F04D 13/08* (2006.01)
(Continued)

(52) U.S. Cl.
CPC .............. *B63G 8/001* (2013.01); *F04D 13/08* (2013.01); *F16L 55/00* (2013.01); *G05D 1/0022* (2013.01);
(Continued)

(58) Field of Classification Search
CPC .... B63G 8/00; B63G 8/001; B63G 2008/007; F04D 13/00; F04D 13/08; F16L 55/00;
(Continued)

(56) References Cited

U.S. PATENT DOCUMENTS 5,660,202 A    8/1997 Rush, Jr. et al.
6,022,421 A    2/2000 Bath et al.
(Continued)

FOREIGN PATENT DOCUMENTS

CN    103310610 A    9/2013
JP    S57-190323 U   12/1982
(Continued)

OTHER PUBLICATIONS

Japan Patent Office, International Search Report in International Application No. PCT/JP2017/041612 (dated Feb. 6, 2018.

*Primary Examiner* — Lars A Olson
(74) *Attorney, Agent, or Firm* — Leydig Voit and Mayer, Ltd.

(57) ABSTRACT

The present invention relates to an underwater drone which is an unmanned mobile which can move in the water, and more particularly to a communication system for the underwater drone which performs communication between the underwater drone and a land-based controller (or maneuvering device). The present invention also relates to an airlock apparatus for the drone which transfers the drone into or from facilities or containers, or equipment sealed (or closed) against surrounding environment. The communication system for an underwater drone includes an underwater drone (1) configured to move in the water, at least one transmitting and receiving antenna (2) provided in an area where the transmitting and receiving antenna (2) can communicate with the underwater drone (1) by wireless communication, and a controller or a maneuvering device (5) connected to the at least one transmitting and receiving
(Continued)

antenna (2) by a wired cable (4) and configured to control the underwater drone (1).

27 Claims, 13 Drawing Sheets

(51) Int. Cl.
*F16L 55/00* (2006.01)
*G05D 1/00* (2006.01)
*G05D 1/02* (2020.01)

(52) U.S. Cl.
CPC ..... *G05D 1/0206* (2013.01); *B63G 2008/007* (2013.01)

(58) Field of Classification Search
CPC . F16L 55/18; F16L 55/26; G05D 1/00; G05D 1/02; G05D 1/0206; G05D 1/0022; B63C 11/00; B63C 11/48
USPC .......................................................... 701/21
See application file for complete search history.

(56) References Cited

U.S. PATENT DOCUMENTS

| | | | | |
|---|---|---|---|---|
| 6,662,742 B2* | 12/2003 | Shelton | .................. | B63G 8/001 114/337 |
| 9,387,928 B1 | 7/2016 | Gentry et al. | | |
| 9,738,360 B2* | 8/2017 | Habeger | ................ | B63G 8/001 |
| 10,185,321 B2* | 1/2019 | Klinger | ................... | G05D 1/02 |
| 10,661,867 B2* | 5/2020 | Zheng | ................... | B63G 8/001 |

FOREIGN PATENT DOCUMENTS

| | | |
|---|---|---|
| JP | S60-249800 A | 12/1985 |
| JP | S61-012896 | 1/1986 |
| JP | S63-305096 A | 12/1988 |
| JP | 1992-055498 U | 5/1992 |
| JP | H05-070117 U | 9/1993 |
| JP | 2000-346273 A | 12/2000 |
| JP | 2001-298068 A | 10/2001 |
| JP | 2001-308766 A | 11/2001 |
| JP | 2002-314467 A | 10/2002 |
| JP | 2006-213265 A | 8/2006 |
| JP | 2009-533038 A | 9/2009 |
| JP | 2010-019412 A | 1/2010 |
| JP | 2011-019354 A | 1/2011 |
| JP | 2012-051545 | 3/2012 |
| JP | 2012-058245 | 3/2012 |
| JP | 2012-087838 A | 5/2012 |
| JP | 2012-229865 A | 11/2012 |
| JP | 2013-63702 A | 4/2013 |
| JP | 2014-198079 A | 10/2014 |
| JP | 2016-203877 A | 12/2016 |
| JP | 2018-001967 A | 1/2018 |
| WO | WO 2013-039222 A1 | 3/2013 |

* cited by examiner

COMMUNICATION SYSTEM FOR UNDERWATER DRONE AND AIRLOCK APPARATUS FOR DRONE

CROSS-REFERENCE TO RELATED APPLICATIONS

This patent application is the U.S. national phase of International Application No. PCT/JP2017/041612, filed Nov. 20, 2017, which claims the benefit of Japanese Patent Application No. 2016-233063, filed on Nov. 30, 2016, and Japanese Patent Application No. 2016-235243, filed on Dec. 2, 2016 which are incorporated by reference in their entireties herein.

TECHNICAL FIELD

The present invention relates to an underwater drone which is an unmanned mobile which can move in the water, and more particularly to a communication system for the underwater drone which performs communication between the underwater drone and a land-based controller (or maneuvering device). The present invention also relates to an airlock apparatus for the drone which transfers the drone into or from facilities or containers, or equipment sealed (or closed) against surrounding environment.

BACKGROUND ART

A drone defined as an unmanned mobile which can move in the air or in the water or in both areas is widely used in various fields such as photographing or monitoring, checking or inspecting, or measuring.

The drone moves autonomously according to a preset object or is maneuvered using a wireless means (one of radio wave, visible light, laser beams of every wavelength range, sonic wave, and ultrasonic wave, or any combination thereof) by a human operator, or is controlled wirelessly by an external controller (including a computer).

The drone defined as an unmanned mobile which can move in the air or in the water or in both areas is expected to be utilized for inspection works of whether instruments in various plants or factories, or various infrastructure equipment (wind electric generating facilities, electrical feeder lines, communication wires, various piping, and the like) to which workers cannot come close have problems. As part of such works, the drones are expected to be used for inspection works of interiors of facilities or containers, or equipment, or piping or the like sealed against surrounding environment, or interiors of facilities or containers, or equipment, or piping or the like whose opening portions opened to surroundings are far away from places to be inspected.

CITATION LIST

Patent Literature

Patent document 1: U.S. Pat. No. 9,387,928
Patent document 2: Japanese laid-open patent publication No. 2012-51545
Patent document 3: Japanese laid-open patent publication No. 2001-308766
Patent document 4: International Patent Publication No. WO 2013/039222
Patent document 5: Japanese laid-open patent publication No. 2012-58245

SUMMARY OF INVENTION

Technical Problem

Among the above-described various drones, the drone which moves autonomously has no problem, but the drone which moves with a wireless command has the following problems.

It is difficult for an underwater drone to perform wireless control at long range because radio wave can hardly be transmitted in the water. Further, high-speed transmission of large quantities of image data can hardly be performed even if an airframe of the drone is equipped with cameras.

As a means for solving these problems, there has been proposed a system in which the underwater drone is connected to a maneuvering device for the operator or an external controller by wire. A part of such system has been put into practical use. Hereinafter, a line for transmitting and receiving the above signals and/or electric power to and from the drone is referred to as a wired cable.

However, in the case where the underwater drone is used for arbitrary works, there is no problem in an open environment where there are no obstacles, but in an environment where there are some objects with which the wired cable is liable to be entangled, normal operation of the drone cannot be performed or the airframe cannot be recovered due to entanglement of the wired cable. As objects with which the wired cable is liable to be entangled, there are natural products such as rock and seaweed; existing wire rods such as electric wire, hose and tube; pipe lines; corner portions of construction objects or structural objects; and artificial objects such as arbitrary goods having complicated shapes. In these circumstances, it is difficult to cope with an environment where there are water current, and the like so that the airframe and the wired cable of the drone are not entangled with the above objects only by a maneuvering method or a control method.

As described above, in the case where the drone is used for inspection works of interiors of facilities or containers, or equipment, or piping or the like, if an opening and closing portion is opened or closed easily to allow the drone to enter facilities or containers, or equipment, or piping or the like, there occurs an unwanted leakage problem in which internal substances comprising harmful materials, radioactive materials, fine foreign materials, or the like are leaked to the outside, or an unwanted leakage problem in which various electromagnetic waves, radiations, noises, microorganisms, or the like are leaked to the outside, or conversely an unwanted intrusion or pollution problem in which substances or various electromagnetic waves, noises, microorganisms, or the like from the outside of the opening and closing portion make entry thereinto and cause pollution.

The present invention has been made in view of the above drawbacks. It is therefore an object of the present invention to provide a communication system for an underwater drone which can perform bidirectional communication between the underwater drone and a land-based controller (or maneuvering device) reliably.

Another object of the present invention is to provide an airlock apparatus for a drone which can prevent internal substances, electromagnetic waves, or the like from being leaked to external environment and can prevent substances in the external environment, electromagnetic waves, or the like from entering interiors of facilities or containers, or equipment, or piping or the like when the drone makes entry into the interiors of facilities or containers, or equipment, or piping or the like as an object to be inspected or the drone is recovered from such interiors.

Solution to Problem

In order to achieve the above object, in one aspect of the present invention, there is provided a communication system for an underwater drone, comprising: an underwater drone configured to move in the water; at least one transmitting and receiving antenna provided in an area where the transmitting and receiving antenna can communicate with the underwater drone by wireless communication; and a controller or a maneuvering device connected to the at least one transmitting and receiving antenna by a wired cable and configured to control the underwater drone.

In a preferred embodiment of the present invention, the at least one transmitting and receiving antenna is installed in the water.

In a preferred embodiment of the present invention, the at least one transmitting and receiving antenna and the wired cable comprise a leakage coaxial cable.

In a preferred embodiment of the present invention, the at least one transmitting and receiving antenna is installed on the underwater drone and serves as a mobile antenna, and wireless communication is performed between the mobile antenna and the underwater drone.

In a preferred embodiment of the present invention, the underwater drone has a function for moving autonomously to an area where the underwater drone can transmit and receive a signal to or from the at least one transmitting and receiving antenna. In a preferred embodiment of the present invention, the at least one transmitting and receiving antenna has a transmitting and receiving end inserted into a container to be inspected which is filled with water.

In a preferred embodiment of the present invention, wireless communication is performed between the at least one transmitting and receiving antenna and the controller or the maneuvering device in place of the wired cable which connects the at least one transmitting and receiving antenna and the controller or the maneuvering device.

In a preferred embodiment of the present invention, the communication system for an underwater drone further comprises another underwater drone which performs wireless communication with said underwater drone.

In one aspect of the present invention, there is provided a communication system for an underwater drone, comprising: a plurality of underwater drones configured to move in the water; and a controller or a maneuvering device configured to control the plurality of underwater drones; wherein the controller or the maneuvering device establishes wireless communication with at least one of the plurality of underwater drones, and controls the plurality of drones by performing wireless communication between at least one underwater drone which has established the wireless communication and other drones.

In a preferred embodiment of the present invention, the respective underwater drones store their own numbers, and execute instructions addressed to themselves from the controller or the maneuvering device; and if the respective underwater drones receive instructions addressed to other underwater drones, the respective underwater drones retransmit the same content to other underwater drones.

In a preferred embodiment of the present invention, the communication system for an underwater drone further comprises another underwater drone which performs wireless communication with at least one of the plurality of underwater drones.

In one aspect of the present invention, there is provided a drone airlock apparatus for transferring a drone to or from an internal space partitioned by a wall portion from surrounding environment through an opening portion provided in the wall portion, comprising: an airlock chamber provided at the surrounding environment side of the wall portion and having a door configured to close the opening portion in an openable and closable manner; wherein the airlock chamber partitions an interior of the airlock chamber from the internal space by closing the door, and is configured to allow the interior of the airlock chamber to communicate with the internal space by opening the door so that the drone is transferred to or from the internal space.

In a preferred embodiment of the present invention, the drone airlock apparatus further comprises a pressure regulating apparatus configured to equalize a pressure in the interior of the airlock chamber and a pressure in the internal space.

In a preferred embodiment of the present invention, the pressure regulating apparatus comprises a vacuum pump or a compressor.

In a preferred embodiment of the present invention, the drone airlock apparatus further comprises a drone advancing and recovering apparatus configured to feed the drone to the internal space and to recover the drone therefrom.

In a preferred embodiment of the present invention, the drone advancing and recovering apparatus comprises a cable hoisting mechanism configured to perform hoisting and rewinding of the wired cable connected to the drone.

In a preferred embodiment of the present invention, the drone advancing and recovering apparatus comprises a holding portion configured to hold the drone and a mechanism configured to move the holding portion.

In a preferred embodiment of the present invention, at least one transmitting and receiving antenna which can communicate with the drone by wireless communication is provided in the airlock chamber.

In a preferred embodiment of the present invention, when the opening portion provided in the wall portion is directed to a downward direction, the airlock chamber is provided on the wall portion through a U-shaped pipe.

In a preferred embodiment of the present invention, the wall portion has an inverted U-shaped pipe portion, and the airlock chamber is installed at the top of the inverted U-shaped pipe portion.

In a preferred embodiment of the present invention, a level of liquid in the inverted U-shaped pipe portion is adjusted by regulating a pressure of the inverted U-shaped pipe portion with the pressure regulating apparatus.

In a preferred embodiment of the present invention, the airlock chamber has a pair of gloves extending from both side plate portions to the interior of the airlock chamber and having airtightness and watertightness so that an operator puts his hands into the gloves and can perform a task in the airlock chamber.

In a preferred embodiment of the present invention, the operator performs opening and closing of the door by using the pair of gloves.

In a preferred embodiment of the present invention, the door comprises a closing flange configured to cover the opening portion, and the operator can perform opening and closing of the closing flange by holding tools through the pair of gloves.

In a preferred embodiment of the present invention, the airlock chamber has a sterilizer configured to sterilize the drone before operation of the drone and/or after operation of the drone.

In a preferred embodiment of the present invention, the airlock chamber has a cleaning apparatus configured to clean the drone before operation of the drone and/or after operation of the drone.

In a preferred embodiment of the present invention, the airlock chamber has a gas purging apparatus configured to allow the airlock chamber to be filled with a purge gas.

In a preferred embodiment of the present invention, the airlock chamber has an incineration and volume reduction apparatus configured to incinerate the drone after operation of the drone.

In a preferred embodiment of the present invention, the airlock chamber has a door configured to transfer the drone to or from the airlock chamber.

In a preferred embodiment of the present invention, the wall portion comprises a wall portion of a pump, and a level of liquid in the pump is adjusted by the pressure regulating apparatus.

Advantageous Effects of Invention

The present invention offers the following advantages.
1) A communication system for an underwater drone can perform bidirectional communication between an underwater drone and a land-based controller (or maneuvering device) reliably even in the water through which radio wave can hardly be transmitted.
2) A wired cable used in the communication system for an underwater drone is not caught by an object in the water or is not entangled with the object in the water.
3) An airlock apparatus for a drone can prevent internal substances, electromagnetic waves, or the like from being leaked to external environment and can prevent substances in the external environment, electromagnetic waves, or the like from entering interiors of facilities or containers, or equipment, or piping or the like when the drone makes entry into the interiors of facilities or containers, or equipment, or piping or the like as an object to be inspected or the drone is recovered from such interiors. Therefore, pollution of the interiors of facilities or containers, or equipment, or piping or the like as an object to be inspected and pollution of the external environment caused by the leaked substances or the intruded substances can be prevented.

DESCRIPTION OF EMBODIMENTS

Figure 1:
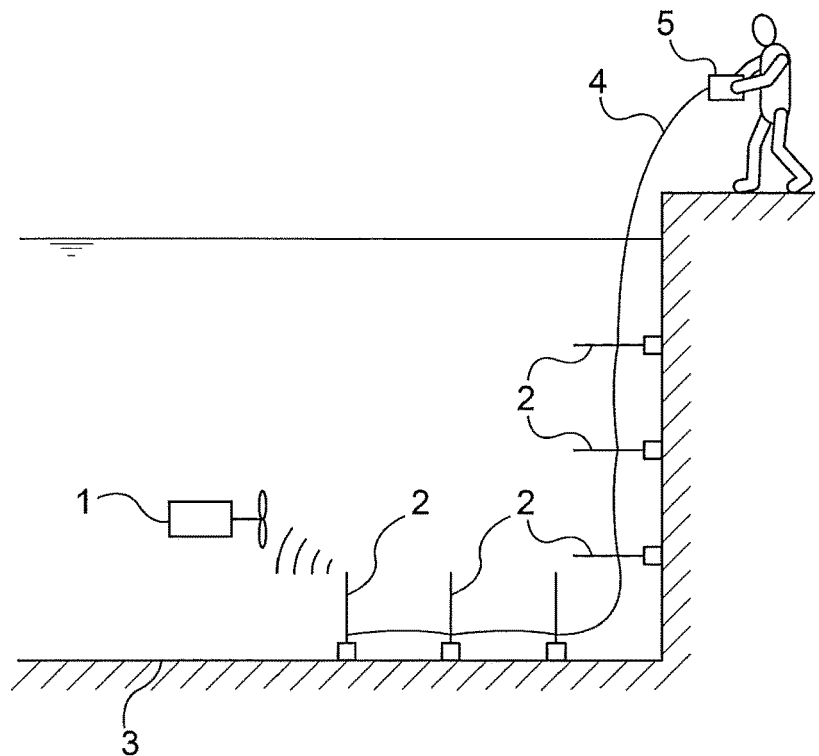
FIG. 1 is a schematic view showing a communication system for an underwater drone according to a first embodiment of the present invention.

A communication system for an underwater drone according to a first aspect of the present invention will be described below with references to FIGS. 1 through 10. Identical or corresponding parts are denoted by identical reference numerals in FIGS. 1 through 10 and will not be described in duplication.

FIG. 1 is a schematic view showing a communication system for an underwater drone according to a first embodiment of the present invention. As shown in FIG. 1, an underwater drone 1 is in operation in the water, and a plurality of transmitting and receiving antennas 2 are disposed in an operation area (working area) of the underwater drone 1. In the illustrated example, the plural transmitting receiving antennas (six transmitting receiving antennas) 2 are arranged in line at predetermined intervals on a side wall and a bottom wall of a water tank 3. The transmitting and receiving antennas 2 may be arranged in a matrix state according to the operation area (working area) of the underwater drone 1. A wired cable 4 is connected to the respective transmitting and receiving antennas 2, and a controller (or maneuvering device) 5 is connected to one end of the wired cable 4. The wired cable 4 connects the land-based controller (or maneuvering device) 5 and all of the transmitting and receiving antennas 2 disposed in the water.

The controller (or maneuvering device) 5 has a built-in radio wave transmitter and a built-in radio wave receiver, and radio wave transmitted from the radio wave transmitter of the controller (or maneuvering device) 5 is sent to the respective transmitting and receiving antennas 2 through the wired cable 4. The respective transmitting and receiving antennas 2 transmit the received radio wave to the underwater drone 1. Because the distance between the transmitting and receiving antenna 2 and the underwater drone 1 is short, attenuation of radio wave is small, and thus the underwater drone 1 can receive radio wave reliably. The underwater drone 1 moves based on the received signals and inspects an object (not shown) to be inspected, and transmits various information including information of the inspection results and position information of the underwater drone 1 to the transmitting and receiving antenna 2 situated in the nearest position. The transmitting and receiving antenna 2 transmits the received signal to the controller (or maneuvering device) 5 through the wired cable 4. A transmitting and receiving antenna group comprising the plural transmitting and receiving antennas 2 is provided such that the plural transmitting and receiving antennas 2 are disposed throughout the operation area (working area) of the underwater drone 1, and transmitting and receiving areas of the adjacent transmitting and receiving antennas 2 are set to be overlapped with each other. Therefore, communication between the underwater drone 1 and the transmitting and receiving antenna 2 is not lost during operation (working) of the underwater drone 1.

Figure 2:
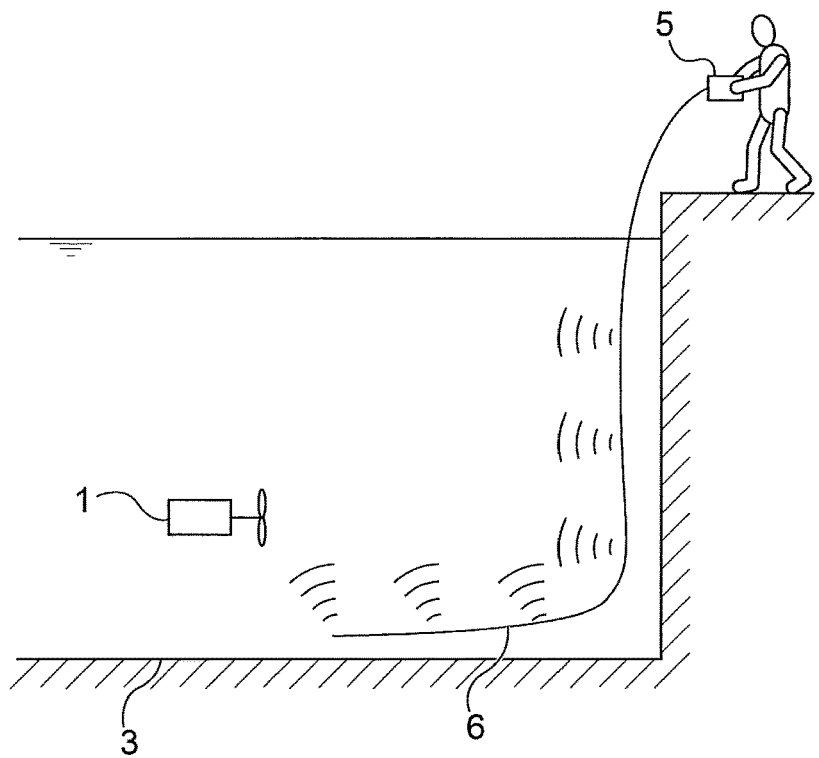
FIG. 2 is a schematic view showing a communication system for an underwater drone according to a second embodiment of the present invention.

FIG. 2 is a schematic view showing a communication system for an underwater drone according to a second embodiment of the present invention. As shown in FIG. 2, the controller (or maneuvering device) 5 is connected to a leakage coaxial cable 6. The leakage coaxial cable 6 extends from the land-based controller (or maneuvering device) 5 over the entire area of the operation area (working area) of the underwater drone 1. The leakage coaxial cable 6 is a coaxial cable type antenna in which holes referred to as slots are provided at regular intervals in an outer conductor of the coaxial cable, and wireless communication is performed by using the holes as the transmitting and receiving antennas.

The controller (or maneuvering device) 5 has a built-in radio wave transmitter and a built-in radio wave receiver, and radio wave transmitted from the radio wave transmitter of the controller (or maneuvering device) 5 is sent to the underwater drone 1 through the leakage coaxial cable 6. Because the distance between the leakage coaxial cable 6 and the underwater drone 1 is short, attenuation of radio wave is small, and thus the underwater drone 1 can receive radio wave reliably. The underwater drone 1 moves based on the received signals and inspects an object (not shown) to be inspected, and transmits various information including information of the inspection results and position information of the underwater drone 1 to the leakage coaxial cable 6. The leakage coaxial cable 6 transmits the received signal to the controller (or maneuvering device) 5. The leakage coaxial cable 6 extends throughout the operation area (working area) of the underwater drone 1, and transmitting and receiving areas of the adjacent slots (holes) in the leakage coaxial cable 6 are set to be overlapped with each other. Therefore, communication between the underwater drone 1 and the leakage coaxial cable 6 is not lost during operation (working) of the underwater drone 1.

Figure 3:
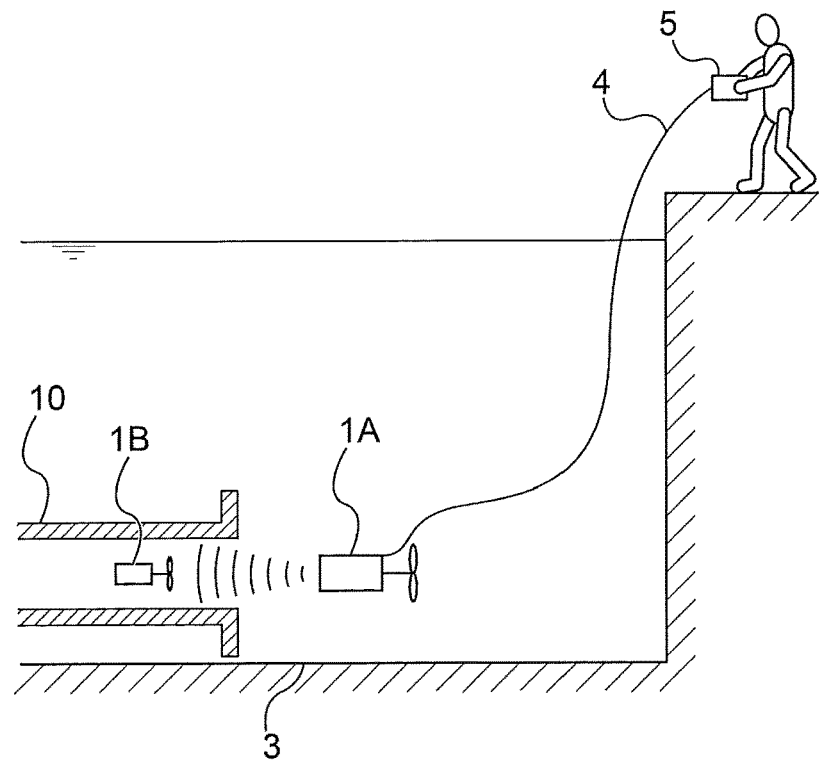
FIG. 3 is a schematic view showing a communication system for an underwater drone according to a third embodiment of the present invention.

FIG. 3 is a schematic view showing a communication system for an underwater drone according to a third embodiment of the present invention. As shown in FIG. 3, an underwater drone 1A is connected to the controller (or maneuvering device) 5 by a wired cable 4. The underwater drone 1A is equipped with a transmitting and receiving antenna, whereby wireless communication between the underwater drone 1A and an underwater drone 1B which moves in an object 10 such as a pipe to be inspected can be performed. Because the underwater drone 1A can move freely in the water, the underwater drone 1A serves as a mobile antenna, and thus the controller (or maneuvering device) 5 can communicate also with the underwater drone 1B through the mobile antenna (underwater drone 1A).

The controller (or maneuvering device) 5 has a built-in radio wave transmitter and a built-in radio wave receiver, and radio wave transmitted from the radio wave transmitter of the controller (or maneuvering device) 5 is sent to the underwater drone 1A through the wired cable 4. The underwater drone 1A transmits the received radio wave to the underwater drone 1B. Because the distance between the underwater drone 1A and the underwater drone 1B is short, attenuation of radio wave is small, and thus the underwater drone 1B can receive radio wave reliably. The underwater drone 1B moves based on the received signals and inspects an object 10 to be inspected, and transmits various information including information of the inspection results and position information of the underwater drone 1B to the underwater drone 1A. The underwater drone 1A transmits the received signal to the controller (or maneuvering device) 5 through the wired cable 4. Because the underwater drone 1A serving as the mobile antenna can approach the operation area (working area) of the underwater drone 1B, communication between the underwater drone 1A and the underwater drone 1B is not lost during operation (working) of the underwater drone 1B.

Figure 4:
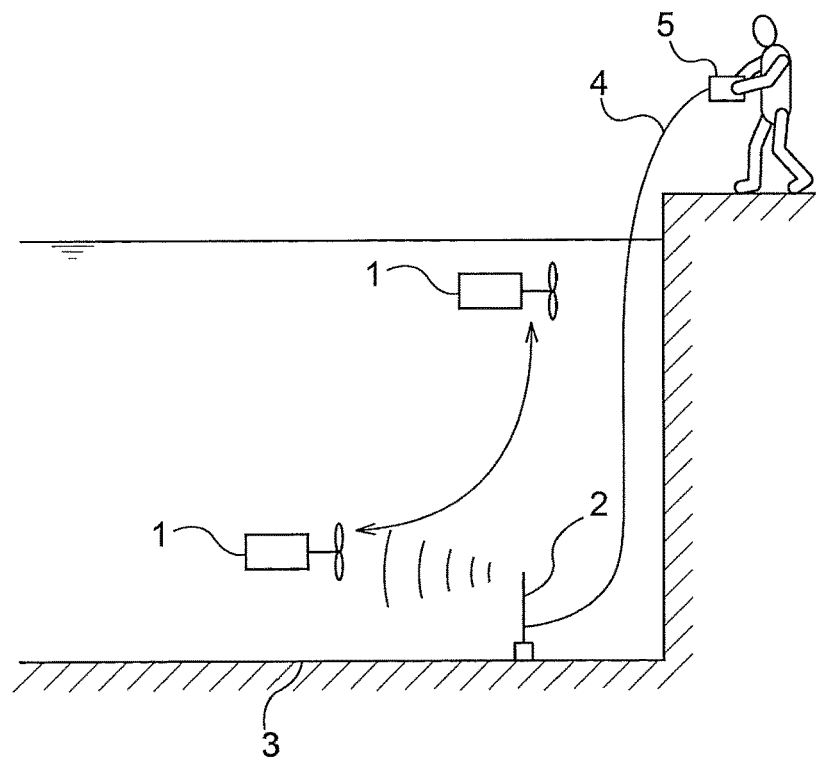
FIG. 4 is a schematic view showing a communication system for an underwater drone according to a fourth embodiment of the present invention.

FIG. 4 is a schematic view showing a communication system for an underwater drone according to a fourth embodiment of the present invention. In the fourth embodiment, the underwater drone 1 has a function for moving autonomously. The transmitting and receiving antenna 2 is disposed on the bottom wall of the water tank 3. A wired cable 4 is connected to the transmitting and receiving antenna 2. A controller (or maneuvering device) 5 is connected to one end of the wired cable 4. The wired cable 4 connects the land-based controller (or maneuvering device) 5 and the transmitting and receiving antenna 2 installed in the water.

The controller (or maneuvering device) 5 has a built-in radio wave transmitter and a built-in radio wave receiver, and radio wave transmitted from the radio wave transmitter of the controller (or maneuvering device) 5 is sent to the transmitting and receiving antenna 2 through the wired cable 4. The transmitting and receiving antenna 2 transmits the received radio wave to the underwater drone 1. The underwater drone 1 moves autonomously between a position close to a water surface and a position close to the bottom wall of the water tank 3, and the underwater drone 1 starts to communicate with the transmitting and receiving antenna 2 when the underwater drone 1 reaches the communicable distance with the transmitting and receiving antenna 2. The underwater drone 1 moves based on the received signals from the transmitting and receiving antenna 2 and inspects an object (not shown) to be inspected, and transmits various information including information of the inspection results and position information of the underwater drone 1 to the transmitting and receiving antenna 2. The transmitting and receiving antenna 2 transmits the received signal to the controller (or maneuvering device) 5 through the wired cable 4. Because the underwater drone 1 has a function for moving autonomously, the underwater drone 1 can approach the communicable distance with the transmitting and receiving antenna 2, and thus communication between the underwater drone 1 and the transmitting and receiving antenna 2 is not lost during operation (working) of the underwater drone 1.

Figure 5:
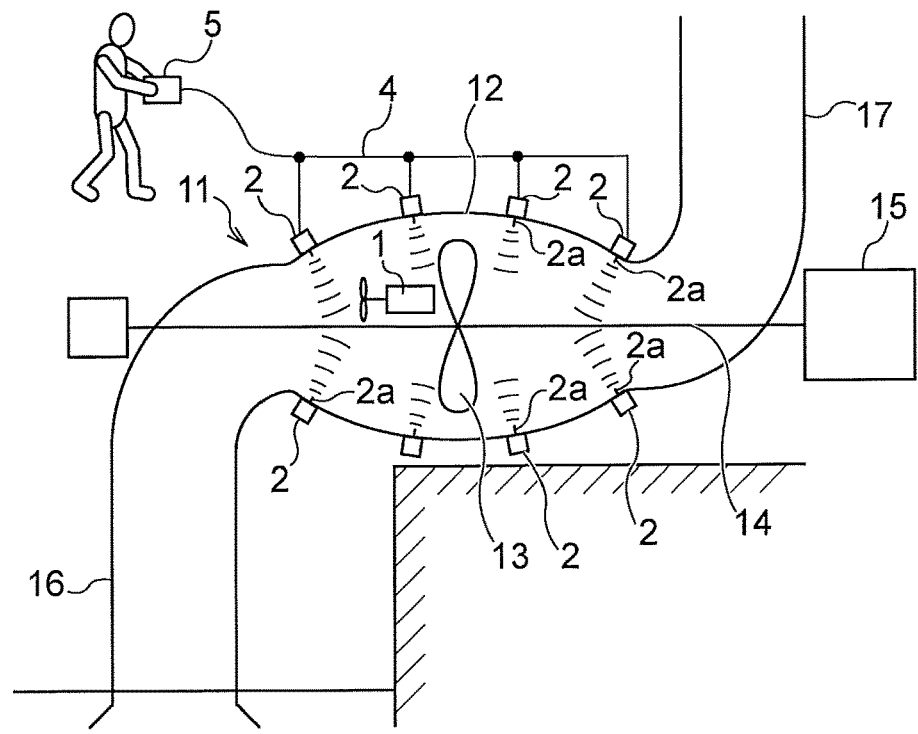
FIG. 5 is a schematic view showing the case where the communication system for an underwater drone shown in FIG. 1 is applied to checking and inspecting of a pump.

FIG. 5 is a schematic view showing the case where the communication system for an underwater drone shown in FIG. 1 is applied to checking and inspecting of a pump. As shown in FIG. 5, a pump 11 comprises a pump casing 12, an impeller 13 provided in the pump casing 12, a main shaft 14 for supporting the impeller 13, and a motor 15 for rotating the impeller 13 and the main shaft 14. A suction pipe 16 and a discharge pipe 17 are connected to the pump casing 12, respectively. The pump casing 12 is filled with water, the underwater drone 1 is in operation in the water in the pump casing 12. A plurality of transmitting and receiving antennas 2 are provided on the pump casing 12. Because a large number of holes such as holes for detecting pressures are formed in the pump casing 12, transmitting and receiving ends 2a of the transmitting and receiving antennas 2 are disposed in the water by utilizing these holes. A wired cable 4 is connected to the respective transmitting and receiving antennas 2, and a controller (maneuvering device) 5 is connected to one end of the wired cable 4.

The controller (or maneuvering device) 5 has a built-in radio wave transmitter and a built-in radio wave receiver, and radio wave transmitted from the radio wave transmitter of the controller (or maneuvering device) 5 is sent to the transmitting and receiving antennas 2 through the wired cable 4. The transmitting and receiving antenna 2 transmits the received radio wave to the underwater drone 1 in the pump casing 12. Because the distance between the transmitting and receiving antenna 2 and the underwater drone 1 is short, attenuation of radio wave is small, and thus the underwater drone 1 can receive radio wave reliably. The underwater drone 1 moves based on the received signals and inspects the impeller 13 and the interior of the pump casing 12 as objects to be inspected, and transmits various information including information of the inspection results and position information of the underwater drone 1 to the transmitting and receiving antenna 2 situated in the nearest position. The transmitting and receiving antenna 2 transmits the received signal to the controller (or maneuvering device) 5 through the wired cable 4. A transmitting and receiving antenna group comprising the plural transmitting and receiving antennas 2 dispersed throughout the entire surface of the pump casing 12 is provided such that the plural transmitting and receiving antennas 2 are disposed throughout the operation area (working area) of the underwater drone 1, and transmitting and receiving areas of the adjacent transmitting and receiving antennas 2 are set to be overlapped with each other. Therefore, communication between the underwater drone 1 and the transmitting and receiving antenna 2 is not lost during operation (working) of the underwater drone 1.

In the case where the plural transmitting and receiving antennas 2 are installed, a means for detecting a position of the underwater drone 1 may be used (i.e., a position sensor of the underwater drone itself may be used, or the antenna may be used as a radar), whereby only the antenna in the vicinity of the underwater drone may be operated. As shown in FIG. 5, in the case where the underwater drone is operated in the closed container filled with water (e.g., a pressure container, a fluid machine such as a water wheel or a pump, or anything), one or more apparatuses (transmitting and receiving antennas) for transmitting and receiving wireless signals (every electromagnetic wave, visible light, LED light, laser beam, sonic wave, or anything) to or from the interior of the container, may be provided, and communication between the underwater drone 1 and the controller (or maneuvering device) 5 may be performed through such apparatuses. Although the controller (or maneuvering device) 5 and the transmitting and receiving antennas 2 are coupled by the wired cable 4, a configuration for performing communication by wireless signals may be used. The transmitting and receiving antennas 2 may be provided in advance when the pump is installed or may be provided later.

Figure 6:
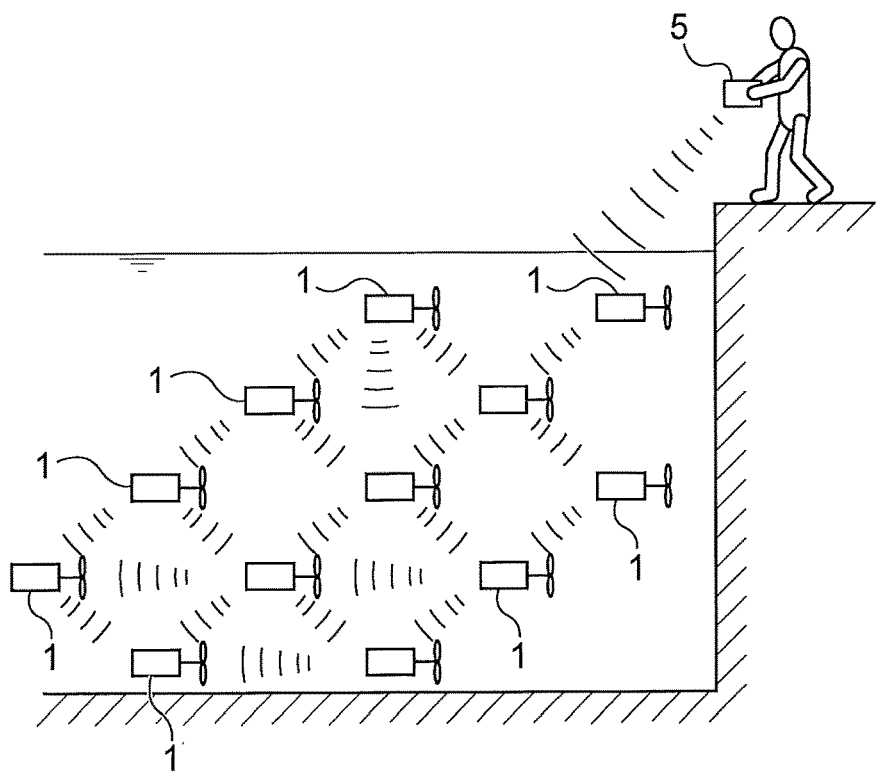
FIG. 6 is a schematic view showing another aspect of a communication system for an underwater drone according to the present invention.

FIG. 6 is a schematic view showing another aspect of a communication system for an underwater drone according to the present invention. In the aspect shown in FIG. 6, the positional relationship in which a plurality of underwater drones 1 and at least one of other underwater drones 1 can communicate with each other by wireless communication is kept, and communication between a certain (arbitrary) underwater drone 1 and the controller (or maneuvering device) 5 is established by their cooperation. In the illustrated example, first, communication between the controller (or maneuvering device) 5 and the underwater drone 1 closest to the controller (maneuvering device) 5 is established, and the underwater drone 1 closest to the controller (maneuvering device) 5 serves as a mobile antenna to perform communication with other underwater drones 1. Sequential serial numbers are assigned to all the underwater drones 1. The respective underwater drones 1 store their own numbers and execute instructions addressed to themselves, and if the respective underwater drones 1 receive instructions which are not addressed to themselves, the respective underwater drones 1 retransmit the instructions having the same content to other underwater drones 1. Sequential serial numbers are assigned to all the instructions. The respective underwater drones 1 store the received instruction numbers addressed to themselves, and ignore the instructions which have already been received. The respective underwater drones 1 execute only instructions which are new and in sequential numerical order. The respective underwater drones 1 send back signals representing the executed instructions after the execution.

Embodiments shown in FIGS. 1 through 6 may be combined in various ways, and these combined embodiments will be described below.

Figure 7:
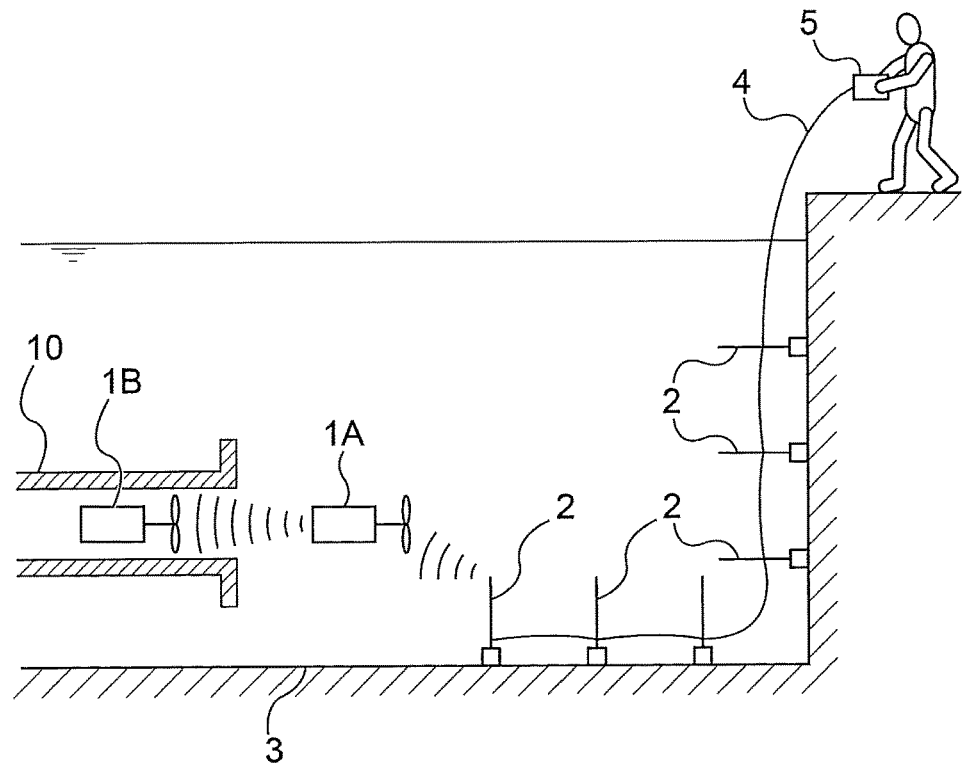
FIG. 7 is a schematic view showing an embodiment in which the embodiment shown in FIG. 1 and the embodiment shown in FIG. 3 are combined.

FIG. 7 is a schematic view showing an embodiment in which the embodiment shown in FIG. 1 and the embodiment shown in FIG. 3 are combined. As shown in FIG. 7, a plurality of transmitting and receiving antennas 2 are disposed in the operation area (working area) of the underwater drone 1A. Radio wave transmitted from the controller (or maneuvering device) 5 is sent to the respective transmitting and receiving antennas 2 through the wired cable 4. The respective transmitting and receiving antennas 2 transmit the received radio wave to the underwater drone 1A. The underwater drone 1A is equipped with a transmitting and receiving antenna, whereby wireless communication between the underwater drone 1A and the underwater drone 1B which moves in the object 10 such as a pipe to be inspected can be performed. Because the underwater drone 1A can move freely in the water, the underwater drone 1A serves as a mobile antenna, and thus the controller (or maneuvering device) 5 can communicate also with the underwater drone 1B through the mobile antenna (underwater drone 1A).

Figure 8:
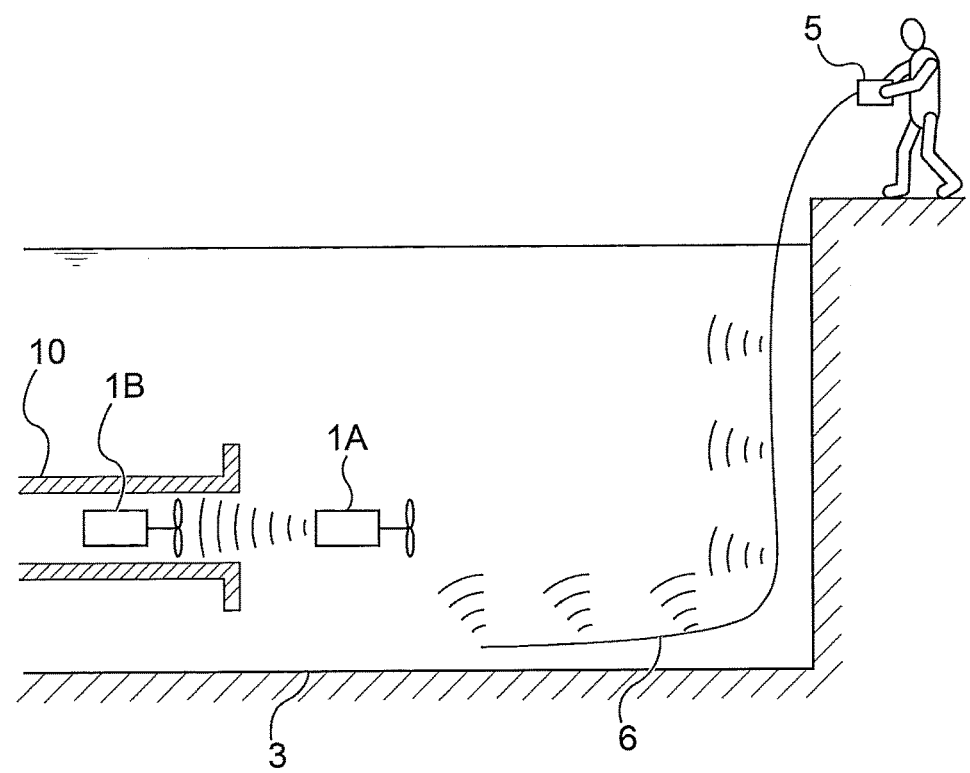
FIG. 8 is a schematic view showing an embodiment in which the embodiment shown in FIG. 2 and the embodiment shown in FIG. 3 are combined.

FIG. 8 is a schematic view showing an embodiment in which the embodiment shown in FIG. 2 and the embodiment shown in FIG. 3 are combined. As shown in FIG. 8, the leakage coaxial cable 6 extends from the land-based controller (or maneuvering device) 5 over the entire area of the operation area (working area) of the underwater drone 1A. Radio wave transmitted from the controller (or maneuvering device) 5 is sent to the underwater drone 1A through the leakage coaxial cable 6. The underwater drone 1A is equipped with a transmitting and receiving antenna, whereby wireless communication between the underwater drone 1A and an underwater drone 1B which moves in the object 10 such as a pipe to be inspected can be performed. Because the underwater drone 1A can move freely in the water, the underwater drone 1A serves as a mobile antenna, and thus the controller (or maneuvering device) 5 can communicate also with the underwater drone 1B through the mobile antenna (underwater drone 1A).

Figure 9:
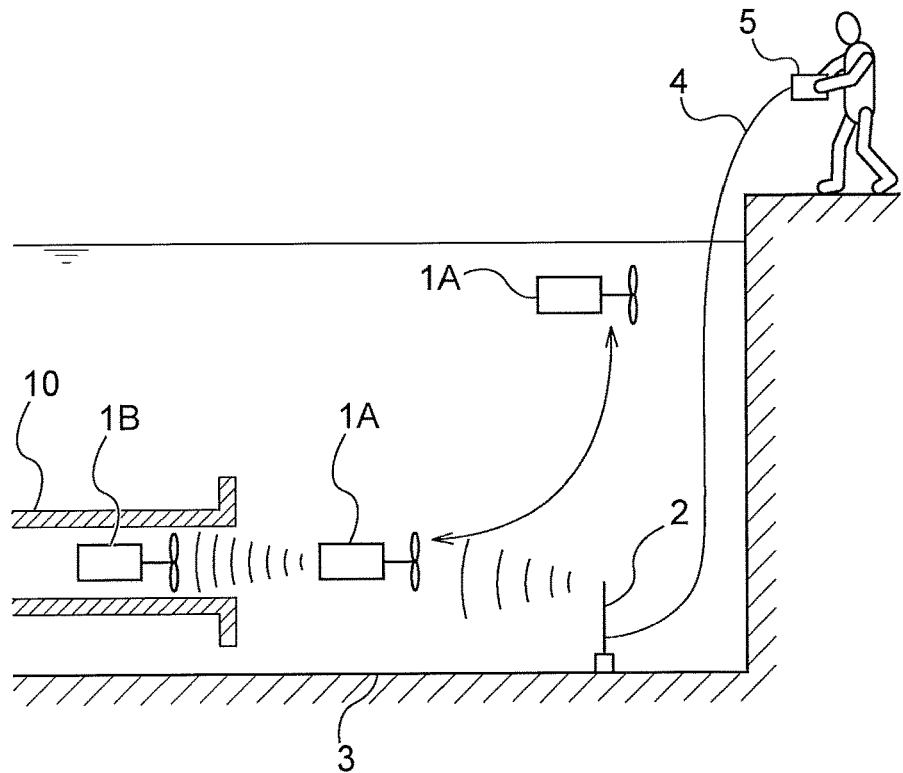
FIG. 9 is a schematic view showing an embodiment in which the embodiment shown in FIG. 4 and the embodiment shown in FIG. 3 are combined.

FIG. 9 is a schematic view showing an embodiment in which the embodiment shown in FIG. 4 and the embodiment shown in FIG. 3 are combined. As shown in FIG. 9, the underwater drone 1A has a function for moving autonomously. Radio wave transmitted from the controller (or maneuvering device) 5 is sent to the transmitting and receiving antenna 2 through the wired cable 4. The transmitting and receiving antenna 2 transmits the received radio wave to the underwater drone 1A. The underwater drone 1A moves autonomously between a position close to a water surface and a position close to the bottom wall of the water tank 3, and the underwater drone 1A starts to communicate with the transmitting and receiving antenna 2 when the underwater drone 1A reaches the communicable distance with the transmitting and receiving antenna 2. The underwater drone 1A is equipped with a transmitting and receiving antenna, whereby wireless communication between the underwater drone 1A and an underwater drone 1B which moves in the object 10 such as a pipe to be inspected can be performed. Because the underwater drone 1A can move freely in the water, the underwater drone 1A serves as a mobile antenna, and thus the controller (or maneuvering device) 5 can communicate also with the underwater drone 1B through the mobile antenna (underwater drone 1A).

Figure 10:
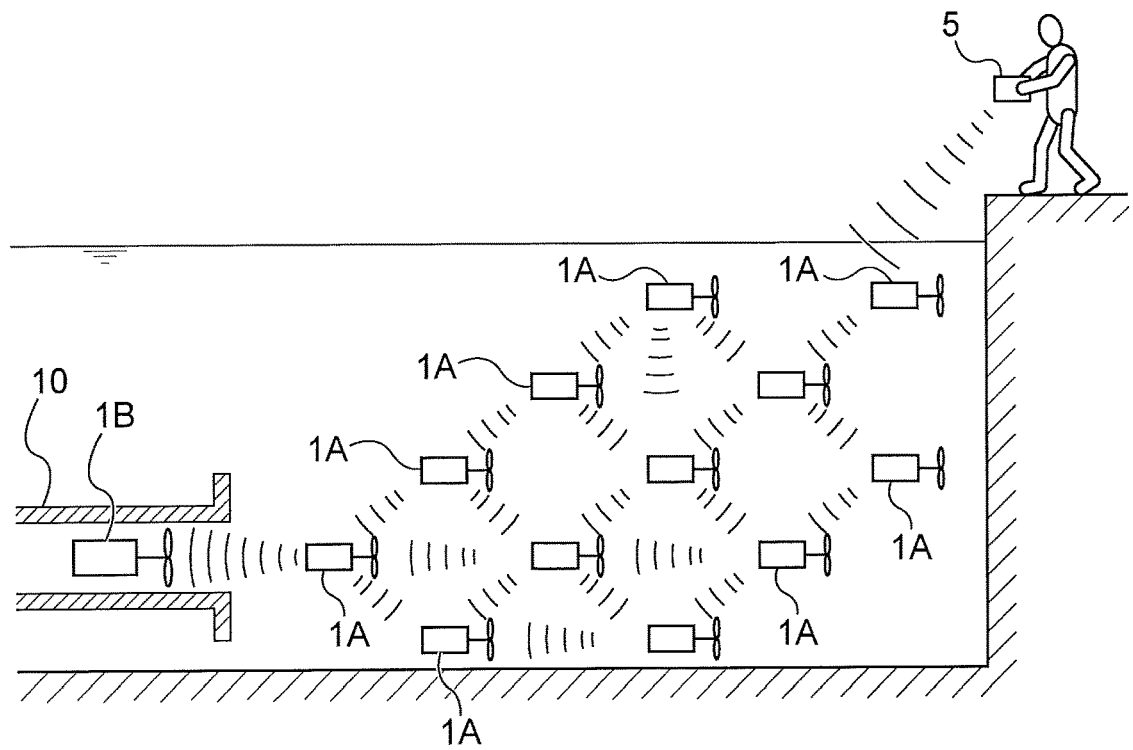
FIG. 10 is a schematic view showing an embodiment in which the embodiment shown in FIG. 6 and the embodiment shown in FIG. 3 are combined.

FIG. 10 is a schematic view showing an embodiment in which the embodiment shown in FIG. 6 and the embodiment shown in FIG. 3 are combined. As shown in FIG. 10, communication between the controller (or maneuvering device) 5 and the underwater drone 1A closest to the controller (maneuvering device) 5 is established, and the underwater drone 1A closest to the controller (maneuvering device) 5 serves as a mobile antenna to perform communication with other underwater drones 1A. The underwater drone 1A is equipped with a transmitting and receiving antenna, whereby wireless communication between the underwater drone 1A and an underwater drone 1B which moves in the object 10 such as a pipe to be inspected. Because the underwater drone 1A can move freely in the water, the underwater drone 1A serves as a mobile antenna, and thus the controller (or maneuvering device) 5 can communicate also with the underwater drone 1B through the mobile antenna (underwater drone 1A).

An airlock apparatus for a drone according to a second aspect of the present invention will be described below with references to FIGS. 11 through 22. Identical or corresponding parts are denoted by identical reference numerals in FIGS. 11 through 22 and will not be described in duplication.

Figure 11:
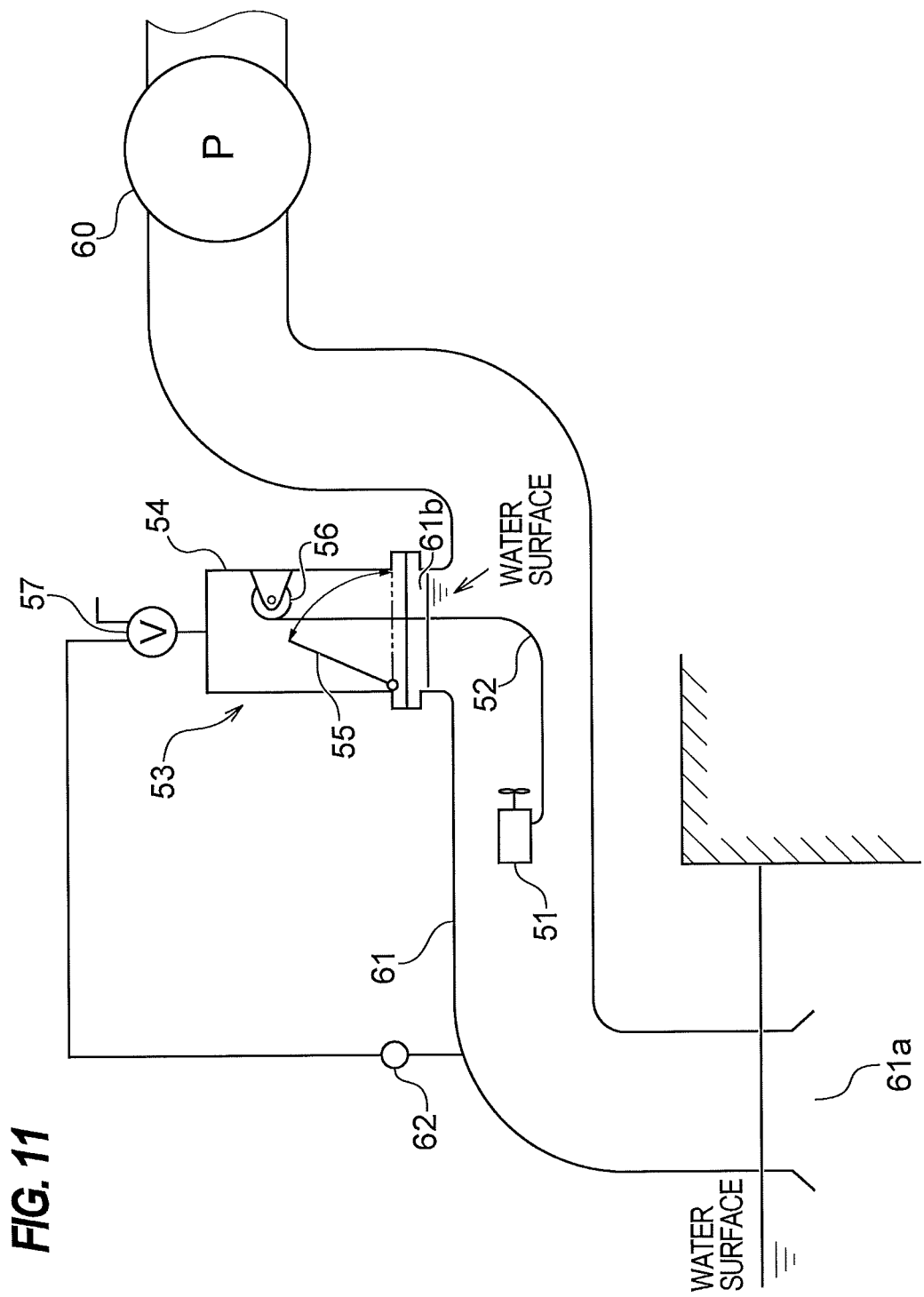
FIG. 11 is a schematic view showing an embodiment in which an airlock apparatus for a drone according to the present invention is applied to a pump.

FIG. 11 is a schematic view showing an embodiment in which an airlock apparatus for a drone according to the present invention is applied to a pump. As shown in FIG. 11, a drone 51 is in operation in the water in a suction pipe 61 of a pump 60. A wired cable 52 for communication is connected to the drone 51, and a controller or a maneuvering device (not shown) is connected to one end of the wired cable 52. A suction port (water inlet) 61a of the suction pipe 61 is located away from an area to be inspected in the suction pipe and is located at a position to which an operator can hardly come close. Therefore, the drone 51 cannot be moved from the suction port 61a of the suction pipe 61 through an interior of the suction pipe 61 to an area to be inspected. Therefore, in the present invention, as shown in FIG. 11, a drone airlock apparatus 53 is attached to an opening portion 61b of the suction pipe 61. Here, the interior of the suction pipe 61 constitutes an internal space partitioned from surrounding environment by a wall portion (piping portion) of the suction pipe. The drone 51 is transferred to or from the internal space through the opening portion 61b provided in the wall portion (piping portion) of the suction pipe 61.

The drone airlock apparatus 53 has an airlock chamber 54, and a door 55 which is freely opened or closed is provided to partition the interior of the airlock chamber 54 from the suction pipe 61. The door 55 is configured to be freely opened or closed by external control. A cable hoisting mechanism 56 is provided in the airlock chamber 54, and the cable hoisting mechanism 56 is configured to perform hoisting and rewinding of the wired cable 52. When the cable hoisting mechanism 56 performs hoisting of the wired cable 52, the drone 51 is recovered in the airlock chamber 54, and when the cable hoisting mechanism 56 performs rewinding of the wired cable 52, the drone 51 enters the suction pipe 61 from the airlock chamber 54. A vacuum pump 57 is installed on the airlock chamber 54 to evacuate the airlock chamber 54 to a vacuum.

In the drone airlock apparatus 53 configured as shown in FIG. 11, when the drone airlock apparatus 53 is operated, the drone 51 is recovered in the airlock chamber 54, and the door 55 is closed to partition the interior of the airlock chamber 54 from the interior of the suction pipe 61. In this state, the vacuum pump 57 starts to be operated to evacuate the airlock chamber 54 to a vacuum. A pressure sensor 62 measures a pressure in the suction pipe 61, and the vacuum pump 57 evacuates the airlock chamber 54 until the pressure in the airlock chamber 54 coincides with the pressure in the suction pipe 61. When the pressure in the suction pipe 61 coincides with the pressure in the airlock chamber 54, operation of the vacuum pump 57 is stopped and the door 55 is opened, and then the drone 51 is made to enter the suction pipe 61. At this time, because the pressure in the suction pipe 61 is balanced with the pressure in the airlock chamber 54, water in the suction pipe 61 never flows into the airlock chamber 54.

At the time of entry of the drone 51, the cable hoisting mechanism 56 performs rewinding of the wired cable 52, so that the drone 51 can enter the suction pipe 61 to a predetermined position in the suction pipe 61 from the airlock chamber 54. The drone 51 receives signals from a controller or a maneuvering device through the wired cable 52 and moves, and inspects the interior of the suction pipe 61 and transmits information of the inspection results to the controller or the maneuvering device. During operation of the drone 51, the pump 60 may be operated or stopped. However, if the pump 60 is operated, there is a danger that the pump 60 sucks the drone 51 therein, and thus it is preferable that the pump 60 is stopped in the case of the drone 51 having a small thrust force.

After the completion of work by the drone 51, the cable hoisting mechanism 56 performs hoisting of the wired cable 52, whereby the drone 51 is recovered in the airlock chamber 54. After the recovery of the drone 51, the door 55 is closed and the interior of the airlock chamber 54 is partitioned from the interior of the suction pipe 61 by the door 55. Thereafter, a vent valve (not shown) is opened to make the interior of the airlock chamber 54 at atmospheric pressure, and then a door (not shown) provided on a top panel portion or a side plate portion of the airlock chamber 54 is opened. Thus, the drone 51 can be taken out of the airlock chamber 54.

Although the embodiment in which the drone airlock apparatus 53 is provided on the suction pipe 61 has been described in FIG. 11, the drone airlock apparatus 53 may be provided on the discharge pipe or the pump casing according to the object to be inspected. Further, the airlock chamber 54 may be removably provided on the pipe such as a suction pipe by a mechanism such as screws, a flange, or the like. When the pressure in the pipe connected to the airlock chamber 54 is a boost pressure, a compressor is used to pressurize air in place of the vacuum pump.

Figure 12:
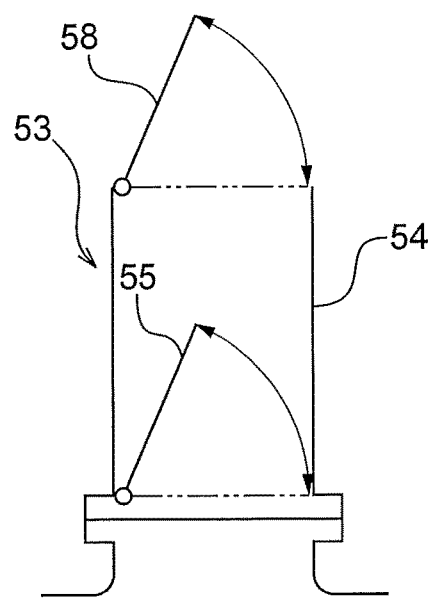
FIG. 12 is a schematic view showing a first modified example of the drone airlock apparatus shown in FIG. 11.

FIG. 12 is a schematic view showing a first modified example of the drone airlock apparatus 53 shown in FIG. 11. As shown in FIG. 12, the airlock chamber 54 of the drone airlock apparatus 53 has a door 58 on a top panel portion thereof, and thus the drone 51 can be transferred to or from the airlock chamber 54 by opening the door 58.

Figure 13:
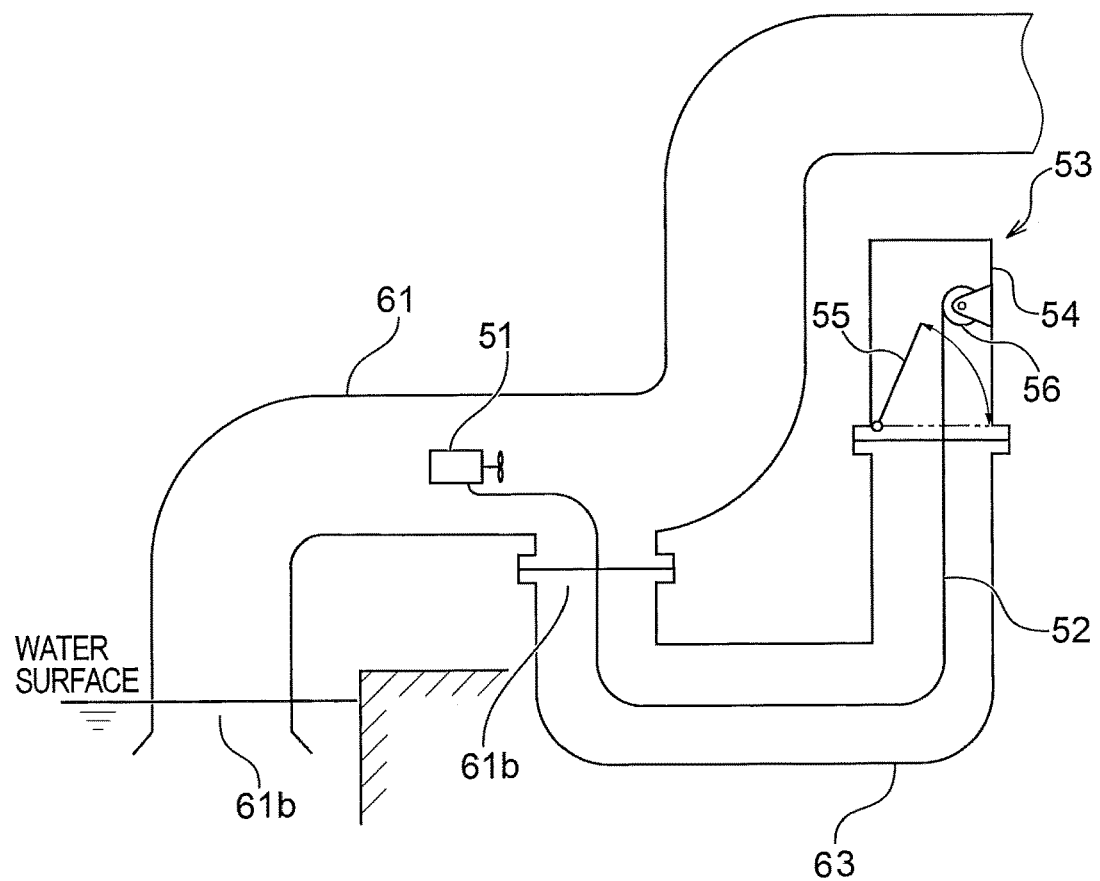
FIG. 13 is a schematic view showing a second modified example of the drone airlock apparatus shown in FIG. 11.

FIG. 13 is a schematic view showing a second modified example of the drone airlock apparatus 53 shown in FIG. 11. As shown in FIG. 13, when the opening portion 61*b* for attaching the drone airlock apparatus 53 is directed to a downward direction, a U-shaped pipe 63 is fixed to the opening portion 61*b*, and the airlock chamber 54 of the drone airlock apparatus 53 is fixed to an upper end of the U-shaped pipe 63. Therefore, the drone 51 can enter the suction pipe 61 from the airlock chamber 54 through the U-shaped pipe 63. Thus, when the opening portion 61*b* is directed to the downward direction, the water surface is made to be directed to an upward direction by the U-shaped pipe 63, and the airlock chamber 54 is fixed to the upper end of the U-shaped pipe 63. In this manner, as described above, when the opening portion 61*b* is directed to the downward direction, the water surface is preferably made to be located at the upper end of the U-shaped pipe 63, thereby allowing air (depressurized state or pressurized state) to exist in the airlock chamber 54. The structure of the wired cable 52, the cable hoisting mechanism 56, or the like is the same as that of the embodiment shown in FIG. 11.

Figure 14:
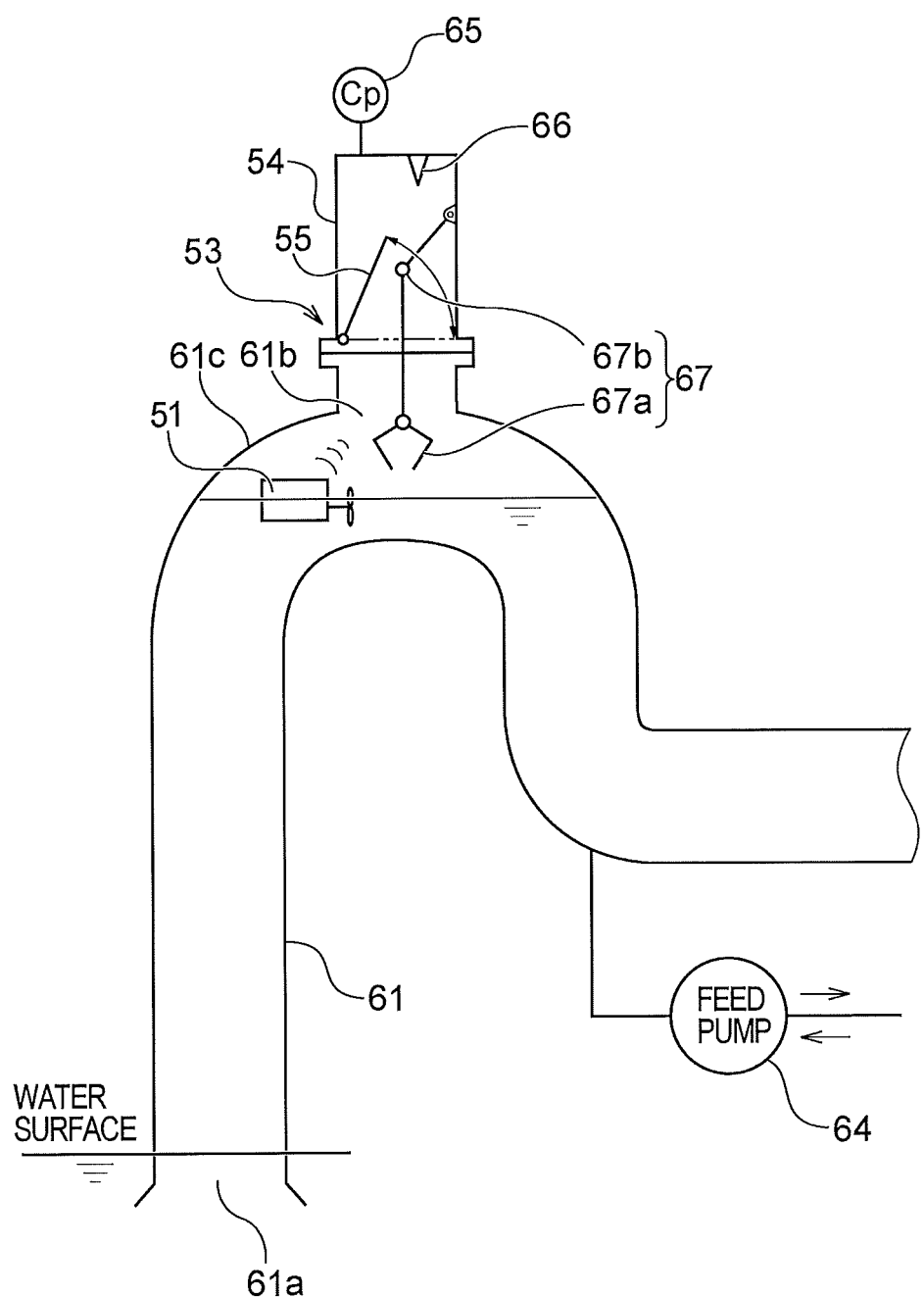
FIG. 14 is a schematic view showing a second embodiment of the drone airlock apparatus according to the present invention.

FIG. 14 is a schematic view showing a second embodiment of the drone airlock apparatus 53 according to the present invention. As shown in FIG. 14, the suction pipe 61 has an inverted U-shaped pipe portion 61*c*, an opening portion 61*b* is formed at the top of the inverted U-shaped pipe portion 61*c*, and the drone airlock apparatus 53 is attached to the opening portion 61*b*. A feed pump 64 is connected to the suction pipe 61. The feed pump 64 is operated to drain water in the inverted U-shaped pipe portion 61*c*, and a compressor 65 provided on the airlock chamber 54 is operated to supply air into the inverted U-shaped pipe portion 61*c*, thereby forming a free surface in the inverted U-shaped pipe portion 61*c*. By regulating a quantity of water drained from the inverted U-shaped pipe portion 61*c* by the feed pump 64 and a quantity of air supplied to the inverted U-shaped pipe portion 61*c* by the compressor 65, the height of the free surface in the inverted U-shaped pipe portion 61*c* is controlled. The drone 51 moves on the free surface in the inverted U-shaped pipe portion 61*c* and inspects the interior of the suction pipe 61, and information of the inspection results is transmitted to a transmitting and receiving antenna 66 provided in the airlock chamber 54 using radio wave. Equipment for inspection such as cameras installed on the drone 51 may be provided in the air or in the water or both in the air and the water.

The radio wave for communication transmitted from the drone 51 is not transmitted in the water, but travels in the air in the inverted U-shaped pipe portion 61*c* and is received by the transmitting and receiving antenna 66. During operation (working) of the drone 51, the free surface in the inverted U-shaped pipe portion 61*c* may be raised or lowered, and the inspection location of the drone 51 may be scanned in a vertical direction. In the present embodiment, because the wired cable is not connected to the drone 51, the drone airlock apparatus 53 is provided with a drone advancing and recovering apparatus 67 which comprises a holding portion 67*a* for holding the drone 51 and a mechanism 67*b* for raising or lowering (or moving) the holding portion 67*a*, and advances the drone 51 into the suction pipe 61 and recovers the drone 51 therefrom.

The free surface in the inverted U-shaped pipe portion 61*c* may be raised or lowered by providing a vacuum pump on the drone airlock apparatus 53 and by controlling a vacuum pressure in the airlock chamber 54 and a vacuum pressure in the inverted U-shaped pipe portion 61*c* with the vacuum pump operated in the same manner as priming water to the pump.

Figure 15A:
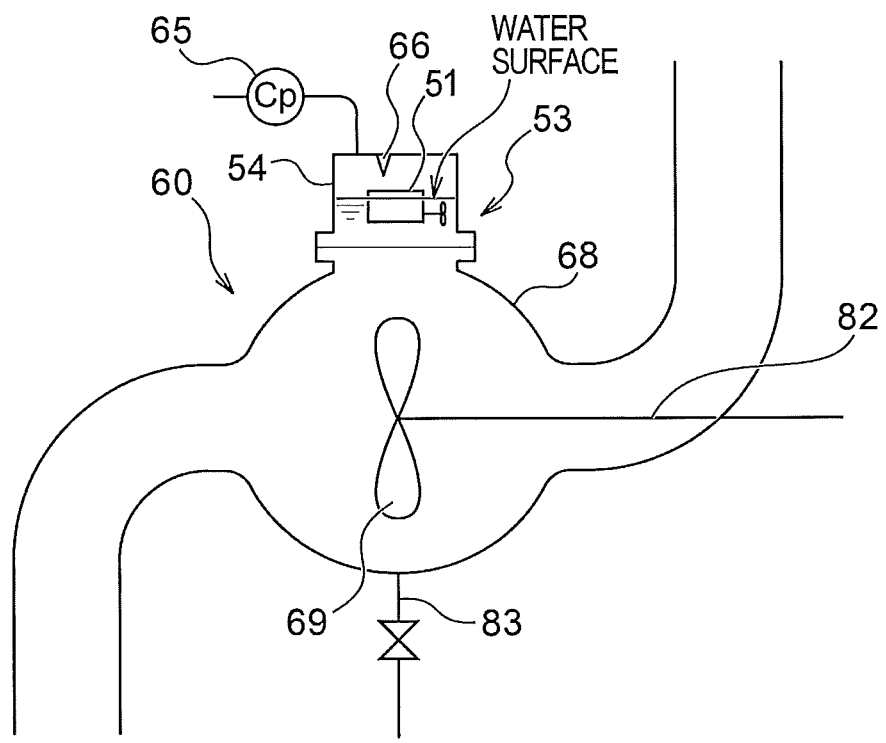
FIG. 15A is a view showing a first modified example of the drone airlock apparatus shown in FIG. 14, and a schematic view showing an example in which the drone airlock apparatus is attached to the pump casing to form a free surface in the pump casing.
Figure 15B:
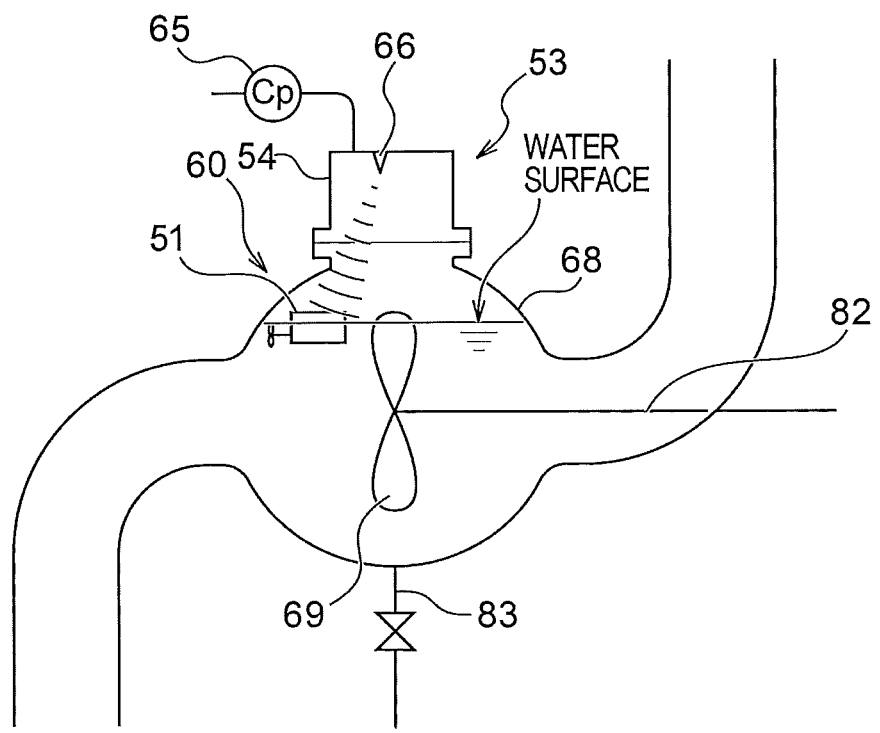
FIG. 15B is a view showing a first modified example of the drone airlock apparatus shown in FIG. 14, and a schematic view showing an example in which the drone airlock apparatus is attached to the pump casing to form a free surface in the pump casing.

FIGS. 15A and 15B are views showing a first modified example of the drone airlock apparatus 53 shown in FIG. 14, and schematic views showing an example in which the drone airlock apparatus 53 is attached to the pump casing to form a free surface in the pump casing. As shown in FIGS. 15A and 15B, the pump 60 comprises a pump casing 68, an impeller 69 installed in the pump casing 68, and a main shaft 82 for supporting the impeller 69. The drone airlock apparatus 53 is installed at the top of the pump casing 68. A drain 83 for supplying and draining water is provided in the bottom portion of the pump casing 68. In FIGS. 15A and 15B, the door 55 or the like for partitioning the interior of the airlock chamber 54 from the pump casing 68 is omitted from illustration.

By operating the compressor 65 provided on the airlock chamber 54 to feed air into the pump casing 68, as shown in FIGS. 15A and 15B, the height of the water surface is lowered to form a free surface in the pump casing 68. By regulating a quantity of air supplied to the pump casing 68 by the compressor 65, the height of the free surface in the pump casing 68 is controlled. The drone 51 moves on the free surface in the pump casing 68 and inspects an inner surface of the pump casing 68 and various equipment (impeller 69 and the like) in the pump casing 68, and information of the inspection results is transmitted to a transmitting and receiving antenna 66 provided in the airlock chamber 54 using radio wave.

The height of the free surface in the pump casing 68 may be controlled by utilizing the drain 83 for supplying and draining water to supply water into the pump casing 68 or to discharge water from the pump casing 68 and hence by adjusting the height of the water surface. The height of the free surface in the pump casing 68 may be controlled by providing a vacuum pump on the drone airlock apparatus 53 and by controlling a vacuum pressure in the pump casing 68 with the vacuum pump operated in the same manner as priming water to the pump.

Figure 16A:
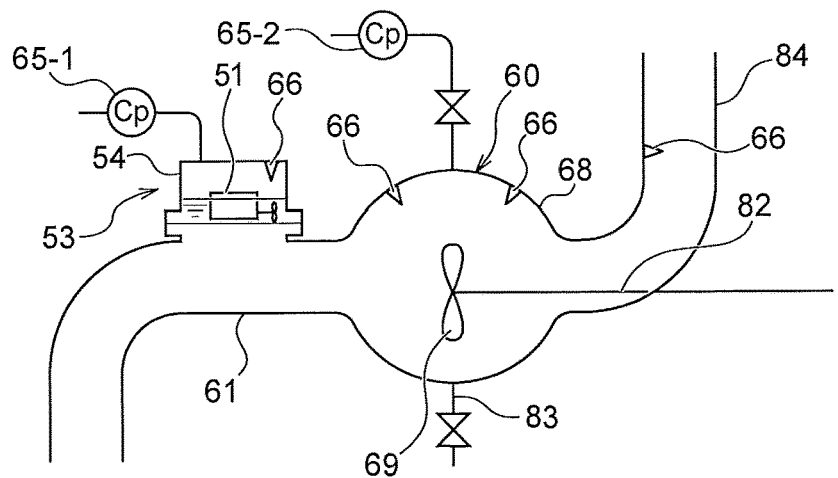
FIG. 16A is a view showing a second modified example of the drone airlock apparatus shown in FIG. 14, and a schematic view showing an example in which the drone airlock apparatus is attached to the suction pipe to form a free surface in the pump casing.
Figure 16B:
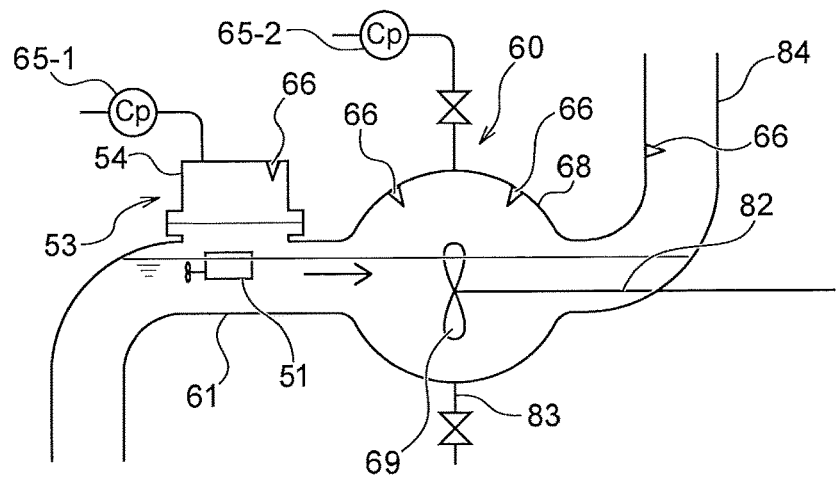
FIG. 16B is a view showing a second modified example of the drone airlock apparatus shown in FIG. 14, and a schematic view showing an example in which the drone airlock apparatus is attached to the suction pipe to form a free surface in the pump casing.
Figure 16C:
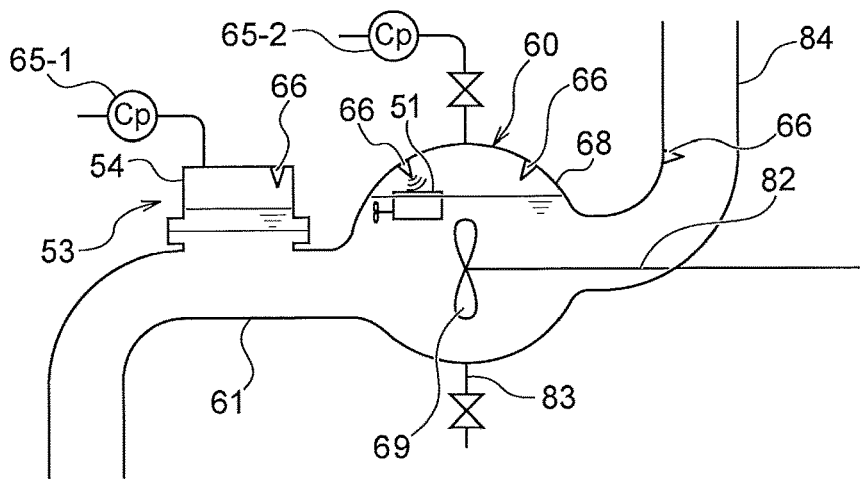
FIG. 16C is a view showing a second modified example of the drone airlock apparatus shown in FIG. 14, and a schematic view showing an example in which the drone airlock apparatus is attached to the suction pipe to form a free surface in the pump casing.

FIGS. 16A, 16B and 16C are views showing a second modified example of the drone airlock apparatus 53 shown in FIG. 14, and schematic views showing an example in which the drone airlock apparatus 53 is attached to the suction pipe to form a free surface in the pump casing. As shown in FIGS. 16A, 16B and 16C, the pump 60 comprises a pump casing 68, an impeller 69 installed in the pump casing 68, and a main shaft 82 for supporting the impeller 69. The drone airlock apparatus 53 is installed on the suction pipe 61 of the pump 60. A drain 83 for supplying and draining water is provided in the bottom portion of the pump casing 68. A first compressor 65-1 is provided on the airlock chamber 54 of the drone airlock apparatus 53, and a second compressor 65-2 is provided on the pump casing 68. One or more transmitting and receiving antennas 66 are provided in the airlock chamber 54, the pump casing 68 and a discharge pipe 84. In FIGS. 16A, 16B and 16C, the door 55 or the like for partitioning the interior of the airlock chamber 54 from the suction pipe 61 is omitted from illustration.

The first compressor 65-1 provided on the airlock chamber 54 is operated to feed air into the suction pipe 61 and the second compressor 65-2 provided on the pump casing 68 is operated to feed air into the pump casing. Therefore, as shown in FIGS. 16A and 16B, the height of the water surface is lowered to adjust a water level in the suction pipe 61 and the pump casing 68, thereby ensuring a route for the drone 51 so that the drone 51 is movable from the interior of the suction pipe 61 to the interior of the pump casing 68. By regulating a quantity of air supplied to the suction pipe by the first compressor 65-1 and a quantity of air supplied to the pump casing 68 by the second compressor 65-2, the height of the free surface in the suction pipe 61 and the pump casing 68 is controlled. After the drone 51 moves into the pump casing 68, as shown in FIG. 16C, the height of the water surface in the airlock chamber 54 or the suction pipe 61 need not coincide with the height of the water surface in the pump casing 68. The drone 51 moves on the free surface in the pump casing 68 and inspects an inner surface of the pump casing 68 and various equipment (impeller 69 and the like) in the pump casing 68, and information of the inspection results is transmitted to a transmitting and receiving antenna 66 provided in the pump casing 68 using radio wave.

By using the first compressor 65-1, the second compressor 65-2, the drain 83 for supplying and draining water, and the vacuum pump properly, the height of the water surface in the suction pipe 61, the pump casing 68 and the discharge pipe 84 may be adjusted, and desired places (an inner surface of the suction pipe 61, an inner surface of the pump casing 68, an inner surface of the discharge pipe 84, and the like) can be inspected.

Although not shown in the embodiment shown in FIGS. 15A and 15B and in the embodiment shown in FIGS. 16A, 16B and 16C, in the case where valves are provided at the upstream side and the downstream side of the pump and these valves are closed, because water is incompressible fluid, it is impossible to adjust a water level only by the vacuum pump or the compressor. In such case, water supply and drainage of water from the drain 83 for supplying and draining water is performed simultaneously with operation of the vacuum pump or the compressor, thereby adjusting the water level.

Figure 17:
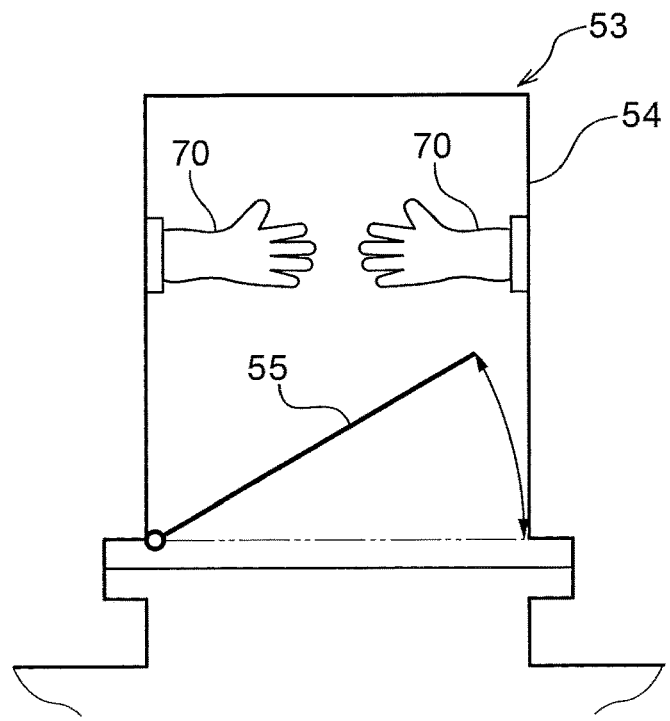
FIG. 17 is a schematic view showing a third embodiment of the drone airlock apparatus according to the present invention.

FIG. 17 is a schematic view showing a third embodiment of the drone airlock apparatus 53 according to the present invention. As shown in FIG. 17, the drone airlock apparatus 53 has a pair of gloves 70, 70 extending from both side plate portions to the interior of the airlock chamber 54. The pair of gloves 70, 70 are gloves having airtightness and watertightness so that the operator puts his hands into the gloves and can perfoun a task in the airlock chamber. In the embodiment shown in FIG. 17, the operator can open or close the door 55 through the gloves 70.

Figure 18:
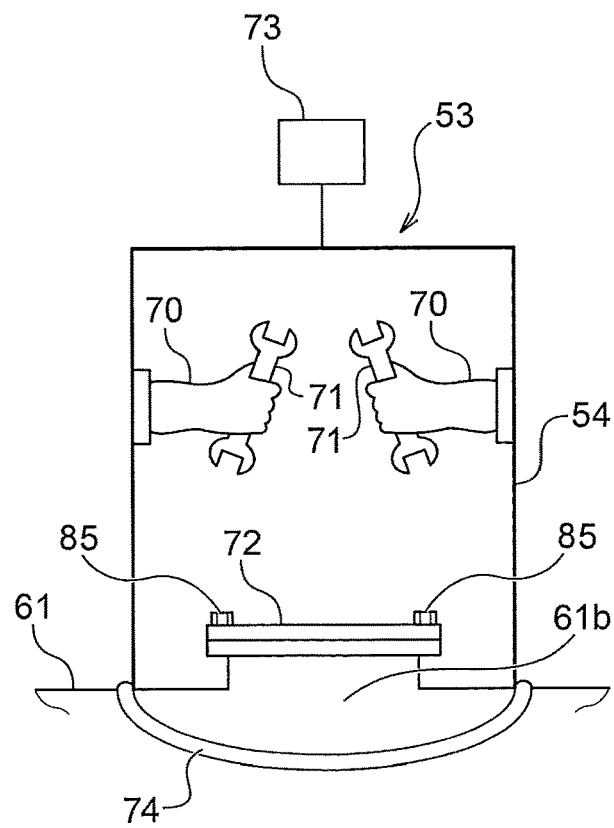
FIG. 18 is a schematic view showing a modified example of the drone airlock apparatus shown in FIG. 17.

FIG. 18 is a schematic view showing a modified example of the drone airlock apparatus 53 shown in FIG. 17. In the example shown in FIG. 18, the operator holds tools 71 through the gloves 70 and can attach or remove a closing flange 72 for partitioning the interior of the airlock chamber 54 from the interior of the suction pipe 61. The closing flange 72 is fixed to a flange around the opening portion 61b of the suction pipe 61 by bolts 85. In the illustrated example, the tool 71 comprises a spanner for attaching or removing the bolt 85. A vacuum pump (or compressor) 73 for adjusting a pressure is provided on the top panel portion of the airlock chamber 54. An airtight packing 74 is provided at the connecting portion between the opening portion 61b of the suction pipe 61 and the airlock chamber 54.

A robot arm may be provided in the interior of the airlock chamber 54 so that the robot arm can attach or remove the closing flange 72.

Although the embodiments in which the drone airlock apparatus according to the present invention is applied to the pump have been described in FIGS. 11 through 18, it should be noted that the present invention can be applied to various plants or various infrastructure equipment without being limited to a fluid machine such as a pump. The present invention is applicable to biohazard defined as all biological causes or conditions which poses a risk to a life such as microorganism including virus, bacteria, and the like or harmful creature, a sterilized room in a medical facility, a bio clean room which controls and manages floating microorganism in the air in a medicinal product field or a food filed, and toxic environment in which there exist a toxic gas, a radioactive material, and the like. The drone airlock apparatus 53 applied to these various environments will be described below.

Figure 19:
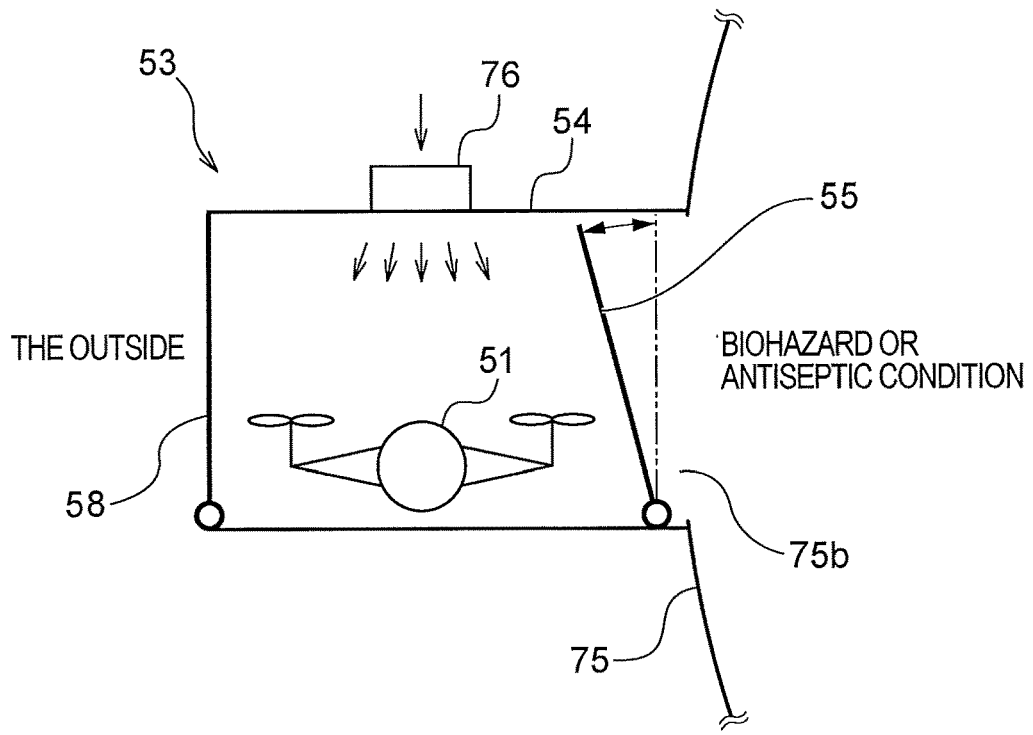
FIG. 19 is a schematic view showing an embodiment in which the drone airlock apparatus according to the present invention is applied to a closed container which isolates and contains biohazard or antiseptic condition environment.

FIG. 19 is a schematic view showing an embodiment in which the drone airlock apparatus 53 according to the present invention is applied to a closed container 75 which isolates and contains biohazard or antiseptic condition environment. Here, the interior of the closed container 75 constitutes an internal space which is partitioned by a wall portion of the closed container from surrounding environment. The drone 51 is transferred to or from the internal space through an opening portion 75b provided in the wall portion of the closed container 75. As shown in FIG. 19, the drone 51 is an aerial drone which can move in the air, and is stored in the airlock chamber 54 of the drone airlock apparatus 53. The drone 51 performs wireless communication with a transmitting and receiving antenna (not shown) provided in the airlock chamber 54 and is controlled by the wireless communication. An openable and closable door 55 for partitioning the interior of the airlock chamber 54 from the interior of the closed container 75 is provided at the connecting portion between the airlock chamber 54 and the closed container 75. The door 55 is openable and closable by external control. A sterilizer 76 is disposed on the top panel portion of the airlock chamber 54 to sterilize the drone 51. Therefore, before operating the drone 51 in the closed container 75 or after operating the drone 51 in the closed container 75, the drone 51 can be sterilized by operating the sterilizer 76. The airlock chamber 54 has a door 58 at its side plate portion, and thus the drone 51 can be transferred to or from the airlock chamber 54 by opening the door 58.

Figure 20:
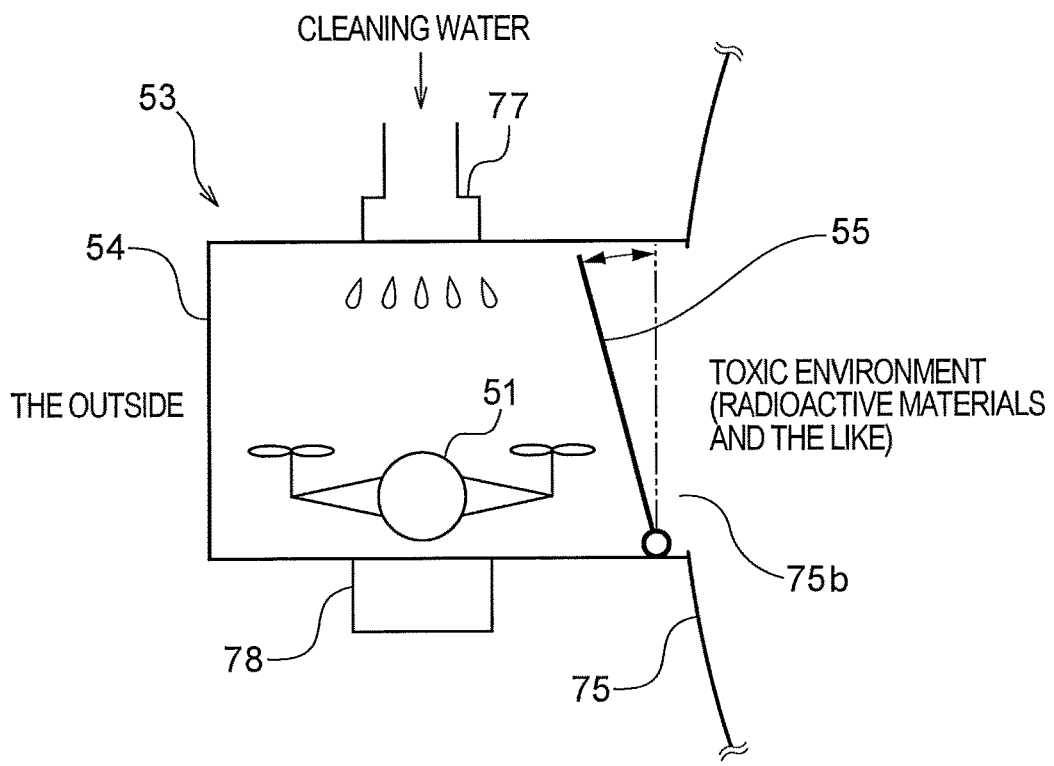
FIG. 20 is a schematic view showing an embodiment in which the drone airlock apparatus according to the present invention is applied to the closed container which isolates and contains toxic environment filled with toxic materials such as a radioactive material.

FIG. 20 is a schematic view showing an embodiment in which the drone airlock apparatus 53 according to the present invention is applied to the closed container 75 which isolates and contains toxic environment filled with toxic materials such as a radioactive material. As shown in FIG. 20, the drone 51 is an aerial drone which can move in the air, and is stored in the airlock chamber 54 of the drone airlock apparatus 53. An openable and closable door 55 for partitioning the interior of the airlock chamber 54 from the interior of the closed container 75 is provided at the connecting portion between the airlock chamber 54 and the closed container 75. The door 55 is openable and closable by external control. A cleaning apparatus 77 is disposed on the top panel portion of the airlock chamber 54 to clean the drone 51. Therefore, before operating the drone 51 or after operating the drone 51, the drone 51 can be cleaned by operating the cleaning apparatus 77. The airlock chamber 54 has a polluted water recovering apparatus 78 at its bottom plate portion, and thus the polluted water after cleaning of the drone 51 can be recovered.

Figure 21:
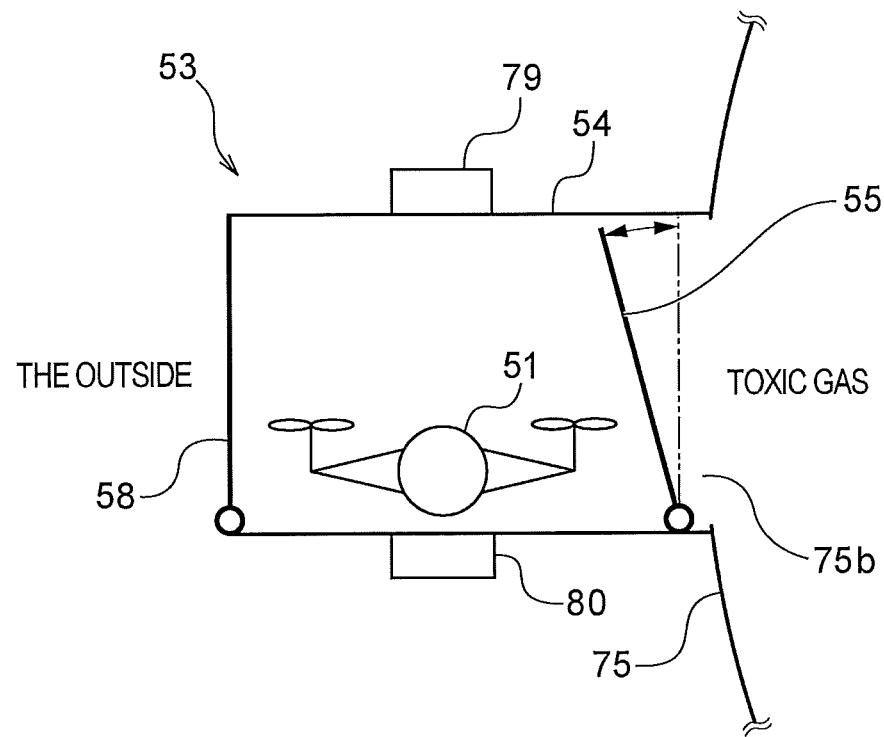
FIG. 21 is a schematic view showing an embodiment in which the drone airlock apparatus according to the present invention is applied to the closed container which isolates and contains toxic gas environment.

FIG. 21 is a schematic view showing an embodiment in which the drone airlock apparatus 53 according to the present invention is applied to the closed container 75 which isolates and contains toxic gas environment. As shown in FIG. 21, the drone 51 is an aerial drone which can move in the air, and is stored in the airlock chamber 54 of the drone airlock apparatus 53. An openable and closable door 55 for partitioning the interior of the airlock chamber 54 from the interior of the closed container 75 is provided at the connecting portion between the airlock chamber 54 and the closed container 75. The door 55 is openable and closable by external control. A gas purging apparatus 79 is disposed on the top panel portion of the airlock chamber 54, and the airlock chamber 54 can be filled with a purge gas. Therefore, before the drone 51 enters the closed container 75, the purge gas is supplied to the airlock chamber 54 from the gas purging apparatus 79, whereby the pressure in the airlock chamber 54 is made higher than the pressure in the closed container 75. Thus, when the drone 51 enters the closed container 75 from the airlock chamber 54, the toxic gas in the closed container 75 can be prevented from flowing into the airlock chamber 54. Further, after the drone 51 is operated in the closed container 75, the drone 51 is recovered by the airlock chamber 54, and then the toxic gas attached to the drone 51 can be removed by operating the gas purging apparatus 79. The airlock chamber 54 has a toxic gas recovering apparatus 80 at its bottom plate portion, and thus the toxic gas removed from the drone 51 can be recovered. The toxic gas recovering apparatus 80 may be replaced with a detoxification apparatus, thereby detoxifying the toxic gas removed from the drone 51.

Figure 22:
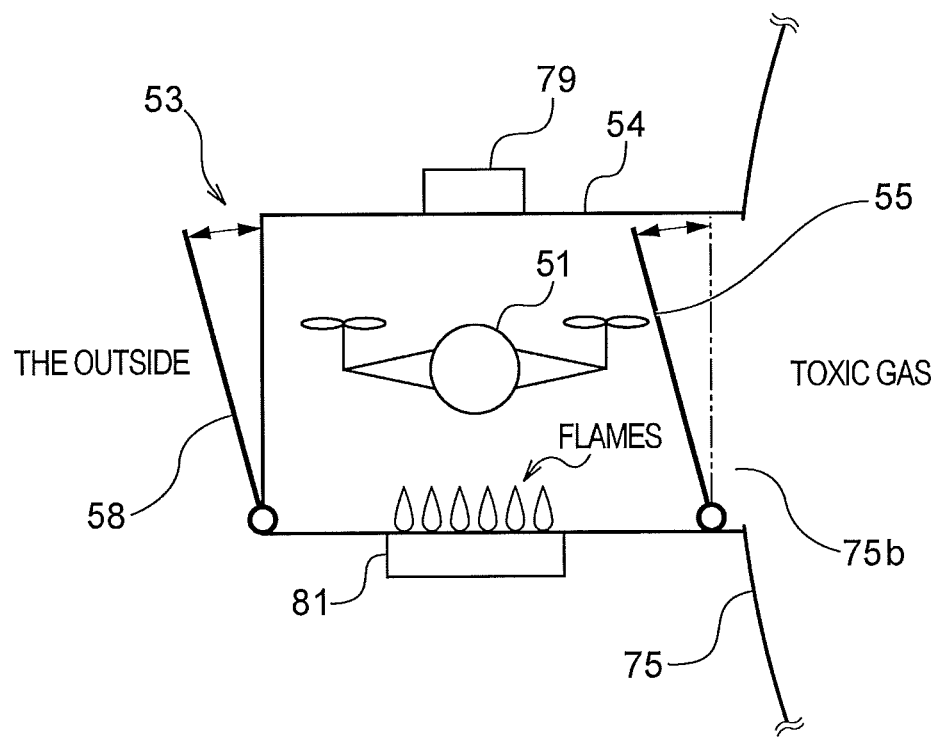
FIG. 22 is a schematic view showing a modified example of the drone airlock apparatus shown in FIG. 21.

FIG. 22 is a schematic view showing a modified example of the drone airlock apparatus 53 shown in FIG. 21. As shown in FIG. 22, a gas purging apparatus 79 is disposed on the top panel portion of the airlock chamber 54, and the airlock chamber 54 can be filled with a purge gas. An incineration and volume reduction apparatus 81 is provided at the bottom portion of the airlock chamber 54. Therefore, after the drone is operated in the closed container 75, the drone 51 is recovered by the airlock chamber 54, and then flames are ejected to the drone 51 by operating the incineration and volume reduction apparatus 81, thereby incinerating the drone 51. Ash after incineration can be recovered by an ash recovery apparatus attached to the incineration and volume reduction apparatus 81.

While the present invention has been described with reference to the embodiments, it is understood that the present invention is not limited to the embodiments described above, but is capable of various changes and modifications within the scope of the inventive concept as expressed herein.

INDUSTRIAL APPLICABILITY

The present invention is applicable to a communication system for an underwater drone which performs communication between the underwater drone and a land-based controller (or maneuvering device). The present invention is also applicable to an airlock apparatus for a drone which transfers the drone to or from facilities or containers, or equipment sealed (or closed) against surrounding environment.

REFERENCE SIGNS LIST 1, 1A, 1B underwater drone
2 transmitting and receiving antenna
2a transmitting and receiving end
3 water tank
4 wired cable
5 controller (or maneuvering device)
6 leakage coaxial cable
10 object
11 pump
12 pump casing
13 impeller
14 main shaft
15 motor
16 suction pipe
17 discharge pipe
51 drone
52 wired cable
53 drone airlock apparatus
54 airlock chamber
55, 58 door
56 cable hoisting mechanism
57 vacuum pump
60 pump
61 suction pipe
61a suction port
61b opening portion
61c inverted U-shaped pipe portion
62 pressure sensor
63 U-shaped pipe
64 feed pump
65 compressor 66 transmitting and receiving antenna
67 drone advancing and recovering apparatus
67a holding portion
67b mechanism for raising or lowering (or moving)
68 pump casing
69 impeller
70 glove
71 tool
72 closing flange
73 vacuum pump (or compressor)
74 airtight packing
75 closed container
75b opening portion
76 sterilizer
77 cleaning apparatus
78 polluted water recovering apparatus
79 gas purging apparatus
80 toxic gas recovering apparatus
81 incineration and volume reduction apparatus
82 main shaft
83 drain for supplying and draining water
84 discharge pipe
85 bolt

The invention claimed is:

1. A communication system for an underwater drone, comprising:
an underwater drone configured to move in the water;
at least one transmitting and receiving antenna provided in an area where the transmitting and receiving antenna can communicate with the underwater drone by wireless communication, the at least one transmitting and receiving antenna having a transmitting and receiving end inserted into a pump casing filled with water, the underwater drone is movably located in the pump casing in which an impeller is disposed; and
a controller or a maneuvering device connected to the at least one transmitting and receiving antenna by a wired cable and configured to control the underwater drone.

2. The communication system for an underwater drone according to claim 1, wherein the at least one transmitting and receiving antenna is installed in the water.

3. The communication system for an underwater drone according to claim 1, wherein the at least one transmitting and receiving antenna and the wired cable comprise a leakage coaxial cable.

4. The communication system for an underwater drone according to claim 1, wherein the at least one transmitting and receiving antenna is installed on the underwater drone and serves as a mobile antenna, and wireless communication is performed between the mobile antenna and the underwater drone.

5. The communication system for an underwater drone according to claim 1, wherein the underwater drone has a function for moving autonomously to an area where the underwater drone can transmit and receive a signal to or from the at least one transmitting and receiving antenna.

6. The communication system for an underwater drone according to claim 1, wherein wireless communication is performed between the at least one transmitting and receiving antenna and the controller or the maneuvering device in place of the wired cable which connects the at least one transmitting and receiving antenna and the controller or the maneuvering device.

7. The communication system for an underwater drone according to claim 1, further comprising another underwater drone which performs wireless communication with said underwater drone.

8. A communication system for an underwater drone, comprising:
a plurality of underwater drones configured to move in the water; and
a controller or a maneuvering device configured to control the plurality of underwater drones;
wherein the controller or the maneuvering device establishes wireless communication with at least one of the plurality of underwater drones, and controls the plurality of drones by performing wireless communication between at least one underwater drone which has established the wireless communication and other drones, and the respective underwater drones store their own numbers, and execute instructions addressed to themselves from the controller or the maneuvering device; and if the respective underwater drones receive instructions addressed to other underwater drones, the respective underwater drones retransmit the same content to other underwater drones.

9. The communication system for an underwater drone according to claim 8, further comprising another underwater drone which performs wireless communication with at least one of the plurality of underwater drones.

10. A drone airlock apparatus for transferring a drone to or from an internal space partitioned by a wall portion from surrounding environment through an opening portion provided in the wall portion, comprising:
an airlock chamber provided at the surrounding environment side of the wall portion and having a door configured to close the opening portion in an openable and closable manner; and
a pressure regulating apparatus configured to equalize a pressure in an interior of the airlock chamber and a pressure in the internal space,
wherein the airlock chamber partitions the interior of the airlock chamber from the internal space by closing the door, and is configured to allow the interior of the airlock chamber to communicate with the internal space by opening the door so that the drone is transferred to or from the internal space, and
the wall portion comprises a wall portion of a pump, and a level of liquid in the pump is adjusted by the pressure regulating apparatus.

11. The drone airlock apparatus according to claim 1, wherein the pressure regulating apparatus comprises a vacuum pump or a compressor.

12. The drone airlock apparatus according to claim 10, further comprising a drone advancing and recovering apparatus configured to feed the drone to the internal space and to recover the drone therefrom.

13. The drone airlock apparatus according to claim 12, wherein the drone advancing and recovering apparatus comprises a cable hoisting mechanism configured to perform hoisting and rewinding of the wired cable connected to the drone.

14. The drone airlock apparatus according to claim 12, wherein the drone advancing and recovering apparatus comprises a holding portion configured to hold the drone and a mechanism configured to move the holding portion.

15. The drone airlock apparatus according to claim 10, wherein at least one transmitting and receiving antenna which can communicate with the drone by wireless communication is provided in the airlock chamber.

16. The drone airlock apparatus according to claim 10, wherein when the opening portion provided in the wall portion is directed to a downward direction, the airlock chamber is provided on the wall portion through a U-shaped pipe.

17. The drone airlock apparatus according to claim 10, wherein the wall portion has an inverted U-shaped pipe portion, and the airlock chamber is installed at the top of the inverted U-shaped pipe portion.

18. The drone airlock apparatus according to claim 17, wherein a level of liquid in the inverted U-shaped pipe portion is adjusted by regulating a pressure of the inverted U-shaped pipe portion with the pressure regulating apparatus.

19. The drone airlock apparatus according to claim 10, wherein the airlock chamber has a pair of gloves extending from both side plate portions to the interior of the airlock chamber and having airtightness and watertightness so that an operator puts his hands into the gloves and can perform a task in the airlock chamber.

20. The drone airlock apparatus according to claim 19, wherein the operator performs opening and closing of the door by using the pair of gloves.

21. The drone airlock apparatus according to claim 20, wherein the door comprises a closing flange configured to cover the opening portion, and the operator can perform opening and closing of the closing flange by holding tools through the pair of gloves.

22. The drone airlock apparatus according to claim 10, wherein the airlock chamber has a sterilizer configured to sterilize the drone before operation of the drone and/or after operation of the drone.

23. The drone airlock apparatus according to claim 10, wherein the airlock chamber has a cleaning apparatus configured to clean the drone before operation of the drone and/or after operation of the drone.

24. The drone airlock apparatus according to claim 10, wherein the airlock chamber has a gas purging apparatus configured to allow the airlock chamber to be filled with a purge gas.

25. The drone airlock apparatus according to claim 10, wherein the airlock chamber has an incineration and volume reduction apparatus configured to incinerate the drone after operation of the drone.

26. The drone airlock apparatus according to claim 10, wherein the airlock chamber has a door configured to transfer the drone to or from the airlock chamber.

27. The communication system for an underwater drone according to claim 1, wherein the at least one transmitting and receiving antenna comprises plural transmitting and receiving antennas dispersed throughout an entire surface of the pump casing.

* * * * *